United States Patent
Zhou et al.

(10) Patent No.: US 10,855,061 B2
(45) Date of Patent: Dec. 1, 2020

(54) WITHDRAWABLE BASE MODULE FOR SWITCH

(71) Applicant: ABB S.p.A., Milan (IT)

(72) Inventors: Qi Zhou, Guangdong (CN); Yanfang Ye, Guangdong (CN); Jiancheng Ren, Guangdong (CN)

(73) Assignee: ABB S.P.A., Milan (IT)

( * ) Notice: Subject to any disclaimer, the term of this patent is extended or adjusted under 35 U.S.C. 154(b) by 0 days.

(21) Appl. No.: 16/376,398

(22) Filed: Apr. 5, 2019

(65) Prior Publication Data
US 2019/0334326 A1    Oct. 31, 2019

(51) Int. Cl.
*H02B 11/167*  (2006.01)
*H02B 11/10*   (2006.01)
*H02B 11/173*  (2006.01)
*H02B 11/127*  (2006.01)
*H01H 9/00*    (2006.01)

(52) U.S. Cl.
CPC .......... *H02B 11/10* (2013.01); *H01H 9/0066* (2013.01); *H02B 11/127* (2013.01); *H02B 11/167* (2013.01); *H02B 11/173* (2013.01)

(58) Field of Classification Search
CPC ...... H02B 11/127; H02B 11/133; H02B 3/00; H02B 11/02; H02B 11/12; H02B 11/167; H02B 11/173; H01H 9/22; H01H 9/20; H01H 33/666; H01H 3/227; H01H 71/0207; H01H 1/38; H01H 3/32; H01H 3/46; H01H 71/12; H01H 9/0066
See application file for complete search history.

(56) References Cited

U.S. PATENT DOCUMENTS

| 5,495,388 A | 2/1996 | Bonetti et al. |
| 7,927,155 B2 * | 4/2011 | Mittu ............... H02B 11/04 200/50.26 |

FOREIGN PATENT DOCUMENTS

| DE | 10 2010 011204 A1 | 9/2011 |
| GB | 2520526 A | 5/2015 |

(Continued)

OTHER PUBLICATIONS

European Patent Office, Extended European Search Report issued in corresponding European application No. 19167073.6, dated Sep. 20, 2019, 7 pp.

*Primary Examiner* — Ahmed M Saeed
(74) *Attorney, Agent, or Firm* — Taft Stettinius & Hollister LLP; J. Bruce Schelkopf

(57) ABSTRACT

The present disclosure relates to a withdrawable base module for a switch. The withdrawable base module comprises a base coupled to a busbar for electrically connected to the switch; a conversion assembly coupled to the base and comprising a drive mechanism, a first female contact and a carrying mechanism adapted to carry the switch; and an auxiliary assembly being slidable relative to the conversion assembly and comprising a first male contact electrically connected to the switch; wherein the drive mechanism is operable to drive the auxiliary assembly to cause the first male contact to move towards and contact the first female contact. The withdrawable base module according to embodiments of the present disclosure can provide a test circuit for the switch, and can achieve the rocking-in or rocking-out of the switch without additional human intervention after completion of the test.

20 Claims, 24 Drawing Sheets

(56) References Cited

FOREIGN PATENT DOCUMENTS

| WO | 0171869 A2 | 9/2001 |
| WO | 2015044053 A1 | 4/2015 |

* cited by examiner

WITHDRAWABLE BASE MODULE FOR SWITCH

FIELD

Embodiments of the present disclosure generally relate to a switch, and more specifically to a withdrawable base module for a switch.

BACKGROUND

Currently, in order to perform quick repair or replacement of a switch, a withdrawable base module is usually used in a switchgear to install the switch. The withdrawable base module is usually mounted on a busbar or a main circuit of the switchgear, and the switch is mounted on the base module by rocking in the withdrawable base module. By using the withdrawable base module, it is possible to implement the repair or replacement of the switch without turning off a main power supply at an upper end of the switch, while reducing the power outage time and the power outage area. In addition, the withdrawable base module usually needs to be operated with a rocker. Therefore, in order to enable users to determine the current position of the switch throughout the operation, there must be a mechanism in the withdrawable base module to indicate the position and state of the switch.

The traditional withdrawable base module usually indicates only two positions: an open position and a close position. When an auxiliary circuit of the switch is tested, a main circuit of the switch needs to be connected. During the test (debugging), there will be a large impact on a load of the main circuit. In addition, the current withdrawable base module is designed to indicate the switch position in a continuous rotation manner, that is, the position and state of the switch are usually indicated by aligning a corresponding position or state with an indication arrow. Due to the inevitable error in manufacturing, such an indication method is liable to cause a deviation in the indication, thereby causing unclear indication and causing trouble to the user. At present, although some withdrawable base modules may achieve correct and accurate status indication, the function needs to be implemented by employing a complicated operation logic, which increases the design, manufacturing and maintenance costs.

SUMMARY

Embodiments of the present disclosure provide a withdrawable base module for a switch, which is capable of separately providing a test circuit for the switch to avoid adversely affecting the load. Furthermore, the rocking-in or rocking-out of the switch can be implemented without additional human intervention.

An aspect of the disclosure discloses a withdrawable base module for a switch. The withdrawable base module comprises a base coupled to a busbar electrically connected to the switch; a conversion assembly coupled to the base and comprising a drive mechanism, a first female contact and a carrying mechanism adapted to carry the switch; and an auxiliary assembly being slidable relative to the conversion assembly and comprising a first male contact electrically connected to the switch; wherein the drive mechanism is operable to drive the auxiliary assembly to cause the first male contact to move towards and contact the first female contact to only close a test circuit for the switch.

In some embodiments, the carrying mechanism includes a rotating shaft protruding towards the switch, and a bearing portion being rotatable about the rotating shaft and adapted to carry the switch.

In some embodiments, the conversion assembly further comprises a switch drive plate coupled to an end of the bearing portion, and operable to move in response to a further operation of the drive mechanism after the test circuit is closed, to cause the bearing portion to rotate about the rotating shaft to drive the switch to move towards the base, such that the switch contacts the base to electrically connect the switch to the busbar to close a main circuit of the switch.

In some embodiments, the drive mechanism comprises a worm operable to rotate about its own axis; a worm gear coupled to the worm and being adapted to rotate about an axis perpendicular to the worm in response to an rotation of the worm; and a drive pin arranged on an outer circumference of the worm gear and being parallel to the axis, the drive pin adapted to rotate about the axis with an rotation of the worm gear.

In some embodiments, the auxiliary assembly comprises an auxiliary drive plate on which the first male contact is mounted, the auxiliary drive plate and the switch drive plate being parallel to each other.

In some embodiments, the auxiliary drive plate comprises an auxiliary drive straight groove extending in a second direction perpendicular to a first direction of movement of the auxiliary drive plate, and the switch drive plate comprises a main arcuate groove with a center being located on the axis, wherein the drive pin is arranged to slide within the auxiliary drive straight groove through the main arcuate groove to drive the auxiliary drive plate to move.

In some embodiments, the auxiliary drive plate further comprises an auxiliary arcuate groove in communication with the auxiliary drive straight groove, a center of the auxiliary arcuate groove is located on the axis, and the switch drive plate comprises a main drive straight groove in communication with the main arcuate groove and extending in the second direction; wherein the drive pin is arranged to slide within the auxiliary arcuate groove through the main drive straight groove to drive the switch drive plate to move.

In some embodiments, the conversion assembly further comprises: a cam being coaxial with the worm gear and adapted to rotate with the worm gear; an indicating wheel comprises an indicator for indicating a state of the switch arranged on an outer circumference of the indicating wheel; and a push rod with one end abutting against a circumferential profile of the cam and the other end being coupled to the indicating wheel, to drive the indicating wheel to rotate in response to an rotation of the cam to indicate a current state of the switch.

In some embodiments, the circumferential profile of the cam comprises a plurality of diameter-enlarged segments and circular arc segments, the plurality of diameter-enlarged segments and circular arc segments are connected to one another.

In some embodiments, the conversion assembly further comprises an elastic member arranged between the push rod and the indicating wheel and configured to cause the push rod to abut against the circumferential profile of the cam.

In some embodiments, the conversion assembly further comprises a housing to at least partially receive the switch drive plate, the drive mechanism and the indicating wheel, the housing comprising an indication window for indicating the current state of the switch.

In some embodiments, the conversion assembly further comprises a cover being parallel to the switch drive plate and comprises a stopping portion towards the switch drive plate; and the drive mechanism further comprises a self-locking mechanism pivotally arranged on the drive pin and comprising a self-locking pin and a protrusion protruding towards the axis; wherein in a case where the drive pin has slid to an end of the main arcuate groove adjacent to the main drive straight groove, the self-locking pin abuts against a side wall of the main arcuate groove and the protrusion is blocked by the stopping portion.

In some embodiments, the cover comprises a first arcuate guide groove arranged to overlap the main arcuate groove and the auxiliary arcuate groove to provide guidance for the drive pin when the drive pin slides along the main arcuate groove and the auxiliary arcuate groove.

In some embodiments, the cover includes a second arcuate guide groove for the bearing portion to pass through and adapted to provide guidance for the bearing portion when the bearing portion rotates about the rotating shaft.

In some embodiments, the first arcuate guide groove comprises an inner chute formed on an inner side wall of the first arcuate guide groove adjacent to the axis, and the inner chute substantially protruding substantially in the first direction such that in a case where the drive pin slides within the main drive straight groove to drive the switch drive plate to move, the self-locking pin slides along the inner chute.

In some embodiments, the main arcuate groove comprises a main chute formed on an outer side wall of the main arcuate groove away from the axis, the main chute extending away from the axis to make the self-locking pin to slide within the main chute and slide into the main arcuate groove when the drive pin slides within the main arcuate groove, and the first arcuate guide groove comprises an outer chute formed on an outer side wall of the first arcuate guide groove away from the axis, and the outer chute overlapping the main chute.

In some embodiments, the cover further comprises a straight guide groove extending in the first direction, and the switch drive plate further comprises a guide block protruding towards the cover, the guide block adapted to slide within the straight guide groove to provide guidance for a movement of the switch drive plate.

In some embodiments, the base further comprises a second female contact arranged to be electrically connected to the busbar; and the withdrawable base module further comprises a mounting assembly, the auxiliary assembly being attached to the mounting assembly (108) and moveable relative to the mounting assembly, the mounting assembly comprising a receiving portion adapted to receive the switch and an engagement portion coupled to the carrying mechanism; and a second male contact via which the switch contacts the second female contact to close the main circuit.

Further features of the present disclosure will be made apparent through the following descriptions of exemplary embodiments with reference to figures.

It should be appreciated that Summary of the Invention is not intended to identify key or important features of embodiments of the present disclosure, not is it intended to limit the scope of the present disclosure. Other features of the present disclosure will be made apparent through the following depictions.

BRIEF DESCRIPTION OF THE DRAWINGS

Through the following detailed description with reference to the accompanying drawings, the above and other objectives, features and advantages of example embodiments disclosed herein will become more comprehensible. In the drawings, a plurality of embodiments of the present disclosure will be illustrated in an exemplary and non-limiting manner, wherein.

DETAILED DESCRIPTION

Figure 1:
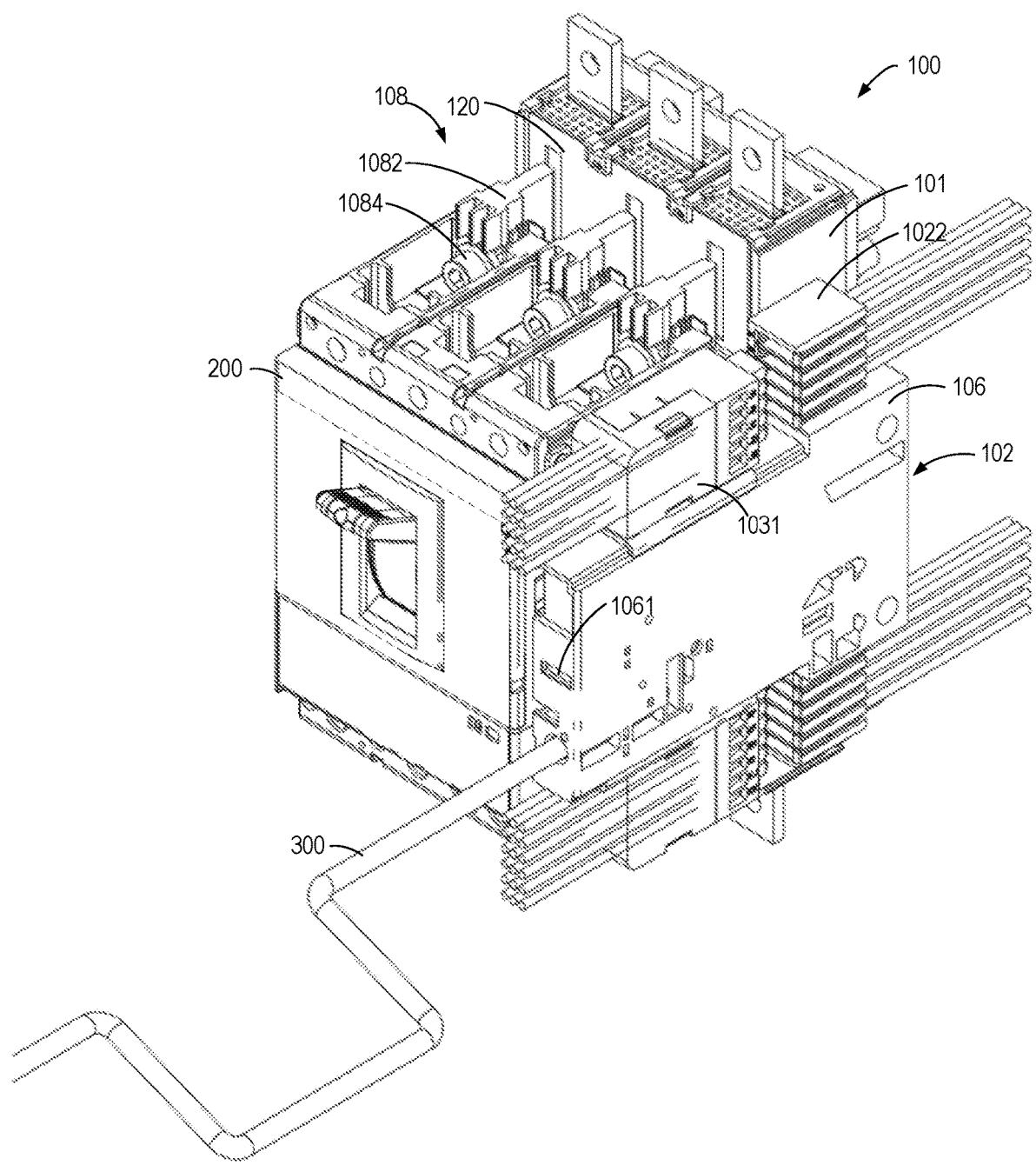
FIG. 1 illustrates a perspective view of a withdrawable base module and switch according to exemplary embodiments of the present disclosure.

Embodiments of the present disclosure provide a withdrawable base module for a switch. With the withdrawable base module according to embodiments of the present disclosure, on the one hand, it is possible to separately provide a test circuit for the switch, thereby avoiding adverse effects on the load and the main circuit. On the other hand, the withdrawable base module can realize the rocking-in or rocking-out of the switch without additional human intervention, and is more convenient to operate, thereby improving efficiency.

Principles of the present disclosure will now be described with reference to various example embodiments illustrated in the drawings. It should be appreciated that the depiction of these embodiments is only to enable those skilled in the art to better understand and further implement the present invention, not intended for limiting the scope of the present invention in any manner. It is noted that wherever practicable similar or like reference numbers may be used in the figures, and may indicates similar or like functionality. One skilled in the art will readily recognize from the following description that alternative embodiments of the structures and methods illustrated herein may be employed without departing from the principles of the present disclosure described therein.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation."

In the current switchgear, in order to facilitate quick overhaul or maintenance of the switch, the withdrawable base module is usually used to install the switch. A conventional withdrawable base module indicates only two positions: an open position and a closed position, and cannot indicate a separate test position, so that the main circuit needs to be closed when the switch is tested. This will have a large impact on the load of the main circuit during the test and, in extreme cases, damage the load.

In addition, the conventional withdrawable base module indicates positions of the switch in a continuous rotation manner. In this manner, the positions of the switch are usually indicated by aligning a corresponding indication with an arrow. However, due to the inevitable error in manufacturing, such method is liable to cause a deviation in the indication, thereby causing misjudgment of the position of the switch. Although some withdrawable base modules may implement correct state indication, the correct state indication needs to be implemented by employing complicated operation logic and structure, which increases the designing, manufacturing, and maintenance costs.

In the process of rocking the withdrawable base module in or out, the traditional withdrawable base module usually requires additional human intervention to adjust the angle and position of certain components to eventually rock the switch in or out. This method causes inconvenience in the use of the withdrawable base module. In addition, if the operation is improper, the operation might make it difficult for the switch to be rocked in or rocked out, or damage the switch.

Embodiments of the present disclosure provide a withdrawable base module 100 that allows the switch 200 to be rocked in or out without additional human intervention, to address or at least partially address the above and other potential problems of the conventional solution.

Figure 2:
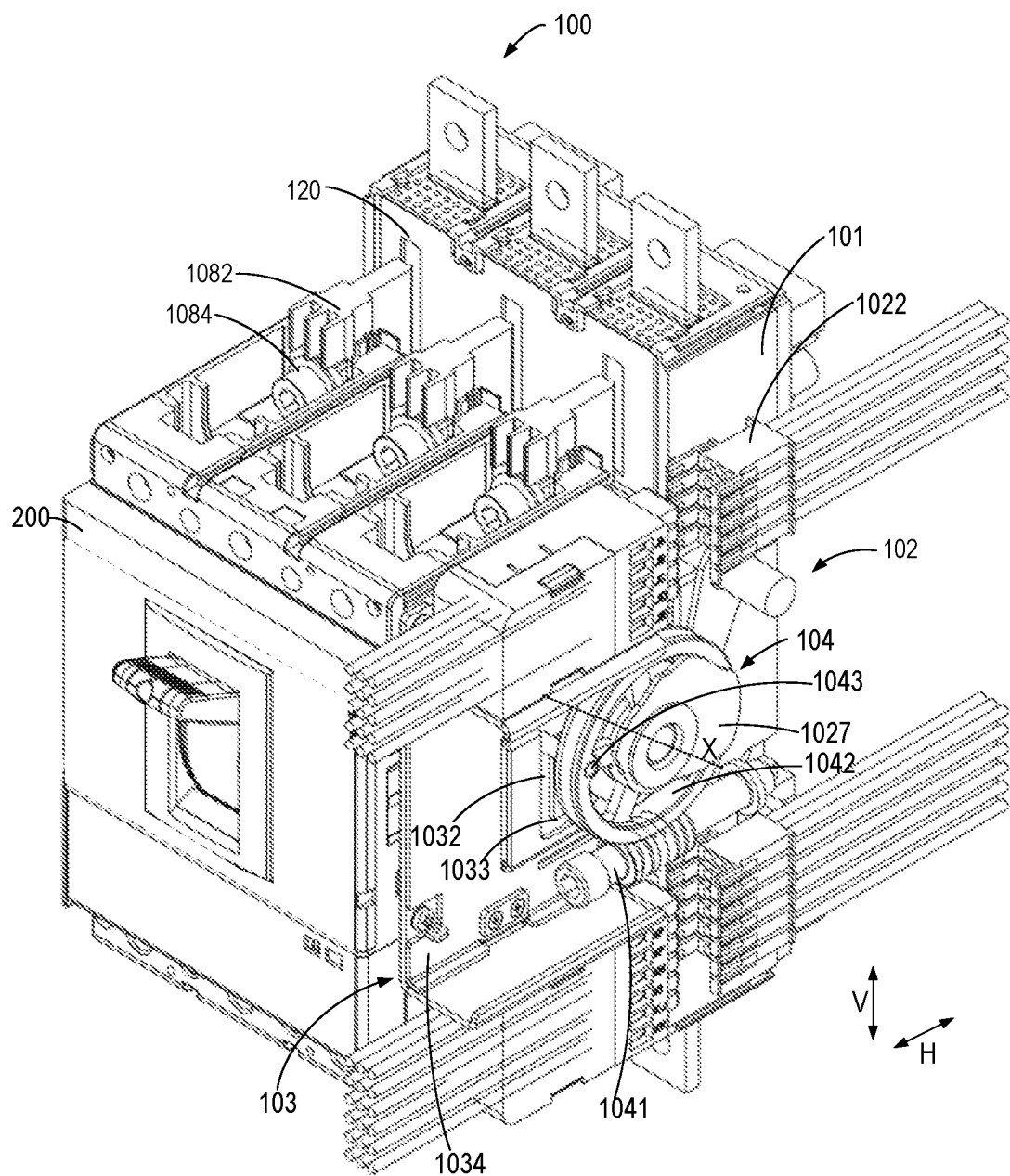
FIG. 2 illustrates a perspective view of a withdrawable base module and a switch according to exemplary embodiments of the present disclosure, wherein a housing of a conversion assembly of the withdrawable base module is omitted to facilitate display of the interior.

An improvement of the withdrawable base module 100 according to exemplary embodiments of the present disclosure will be described in detail below with reference to FIGS. 1 through 12. FIG. 1 shows a perspective view of a withdrawable base module 100 and a switch 200 according to exemplary embodiments of the present disclosure; FIG. 2 illustrates a perspective view of a withdrawable base module 100 and a switch 200 according to exemplary embodiments of the present disclosure, wherein a housing 106 of a conversion assembly 102 of the withdrawable base module is omitted to facilitate display of the internal structure.

In general, as shown in FIGS. 1 and 2, the withdrawable base module 100 according to embodiments of the present disclosure includes a base 101, a conversion assembly 102, and an auxiliary assembly 103. The base 101 is coupled to a busbar of the switchgear for electrically connecting the switch 200. The conversion assembly 102 is coupled to the base 101, for example, in some embodiments, the conversion assembly 102 is coupled to the base 101 via bolt fastening. It should be understood that the manner is merely exemplary and is not intended to limit the scope of the disclosure. Any suitable coupling manner is possible. For example, in some embodiments, the conversion assembly 102 may also be coupled to the base 101 by means of a plug connection, snap-fit connection, or the like.

Figure 3A:
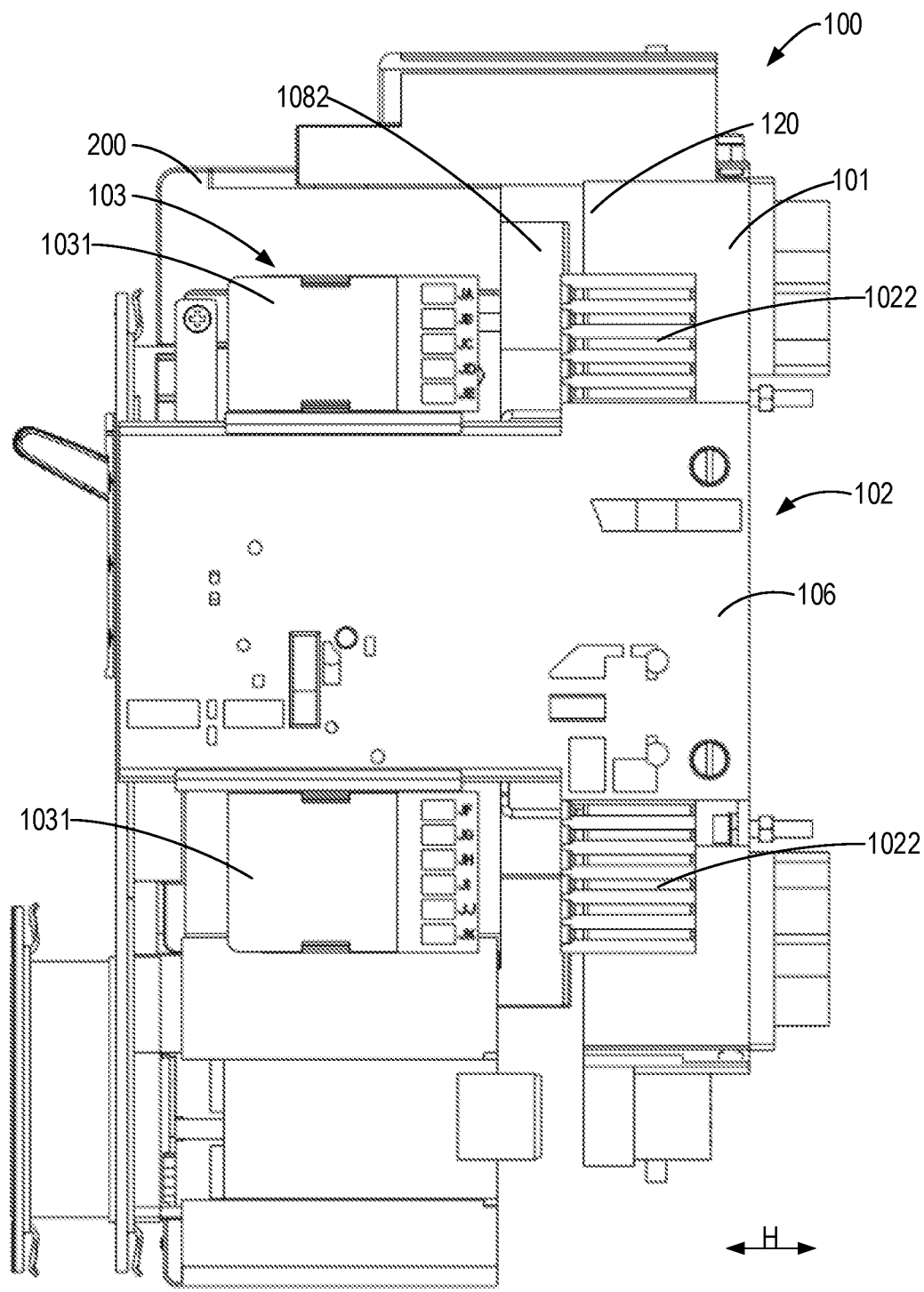
FIG. 3A to FIG. 3C illustrate side views of a process of using the withdrawable base module according to exemplary embodiments of the present disclosure to rock in the switch.
Figure 5:
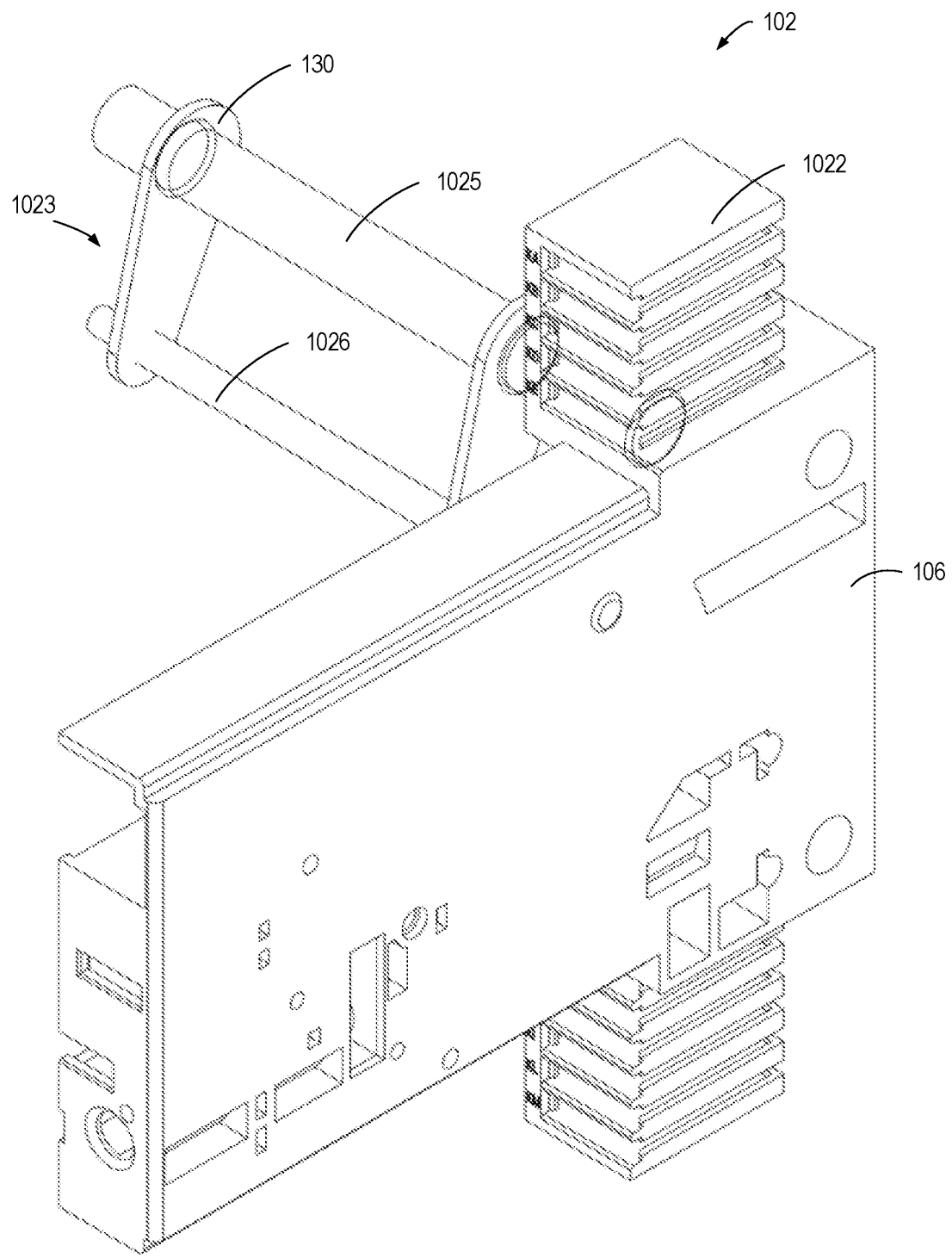
FIG. 5 illustrates a perspective view of a conversion assembly of the withdrawable base module according to exemplary embodiments of the present disclosure.

As shown in FIGS. 2 and 5, the conversion assembly 102 comprises a drive mechanism 104, a first female contact 1022 (auxiliary female contact), and a carrying mechanism 1023 for carrying the switch 200. The first female contact 1022 is used to contact a first male contact 1031 (auxiliary male contact) to close a test circuit. The first male contact 1031 is disposed on the auxiliary assembly 103. After the switch 200 is placed on the withdrawable base module 100 in a specific manner which will be further illustrated below, the user or operator may actuate the drive mechanism 104 by virtue of an operation member 300 (for example, an Allen wrench), as shown in FIGS. 1, 2 and 3A. The auxiliary assembly 103 is thereby driven by the drive mechanism 104 to slide relative to the conversion assembly 102 to cause the first male contact 1031 to move towards and contact the first female contact 1022, thereby closing the test circuit, as shown in FIG. 3B.

Signal lines may be arranged on the first male contact 1031 and the first female contact 1022, and is connected to signal lines of some sensors or microswitches on a control unit (not shown) and the switch 200. Contacting of the first male contact 1031 with the first female contact 1022 will connect the control unit to the sensors or microswitches to test some performance of the switch 200.

Figure 3B:
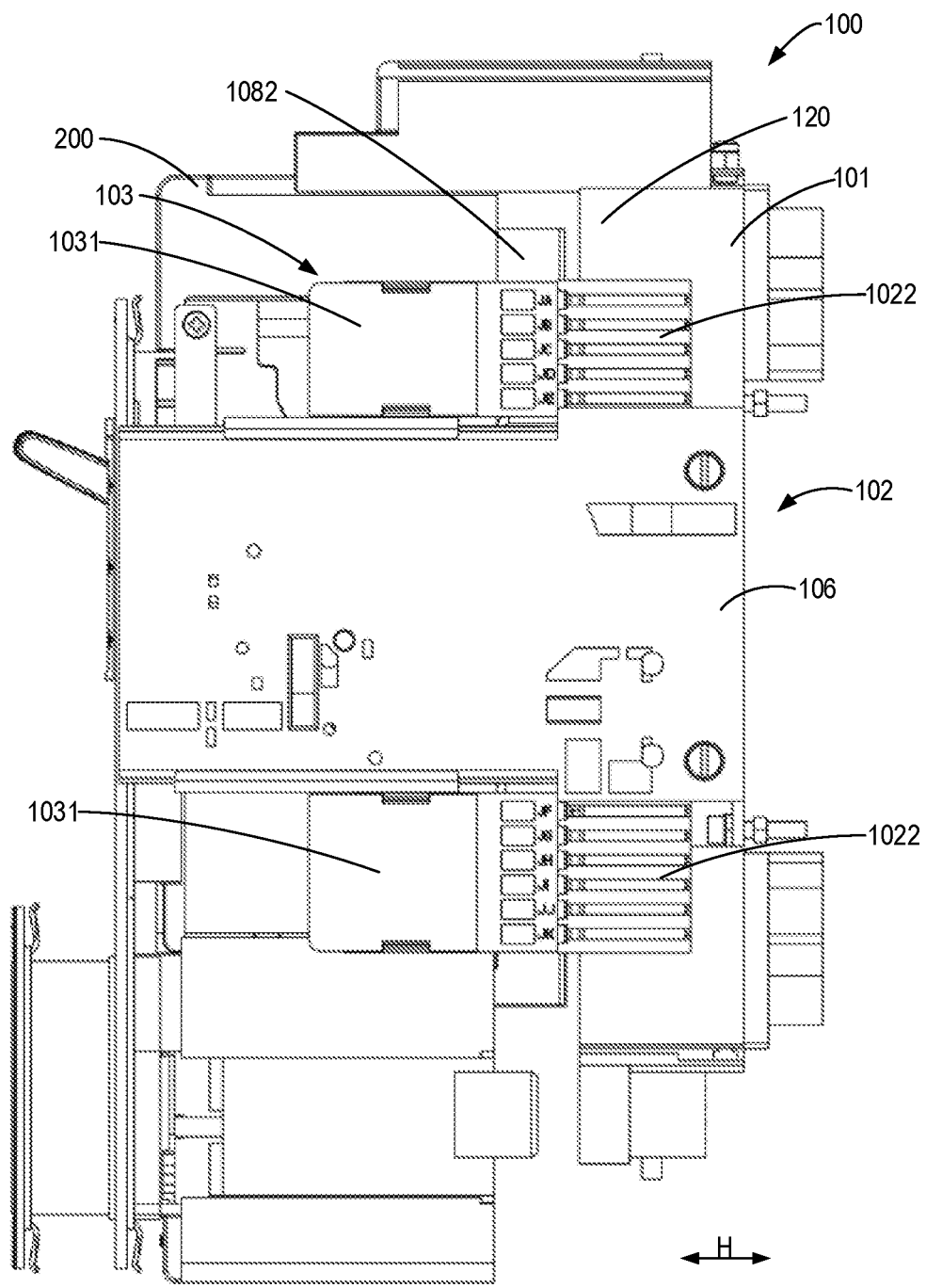

It may also be seen from FIG. 3B that a second male contact 1082 (main male contact) and a second female contact 120 (main female contact) on the base 101 for closing the main circuit do not contact with each other, that is to say, only the test circuit is closed at this time, whereas the main circuit is not closed. It may be seen that, unlike the conventional withdrawable base module, the withdrawable base module 100 according to embodiments of the present disclosure further comprises the first male contact 1031, the first female contact 1022 for closing the test circuit. When the function test of the switch 200 is performed, it is only necessary to close the test circuit without closing the main circuit, thereby ensuring the power use safety of the load on the main circuit and ensuring the safety when the switch 200 is tested.

Furthermore, in some embodiments, the first male contact 1031, the first female contact 1022 may be disposed to be selectively mountable on the withdrawable base module 100. The user installs the first male contact 1031 and the first female contact 1022 when the switch 200 needs to be tested. Such arrangement may further reduce costs.

Figure 3C:
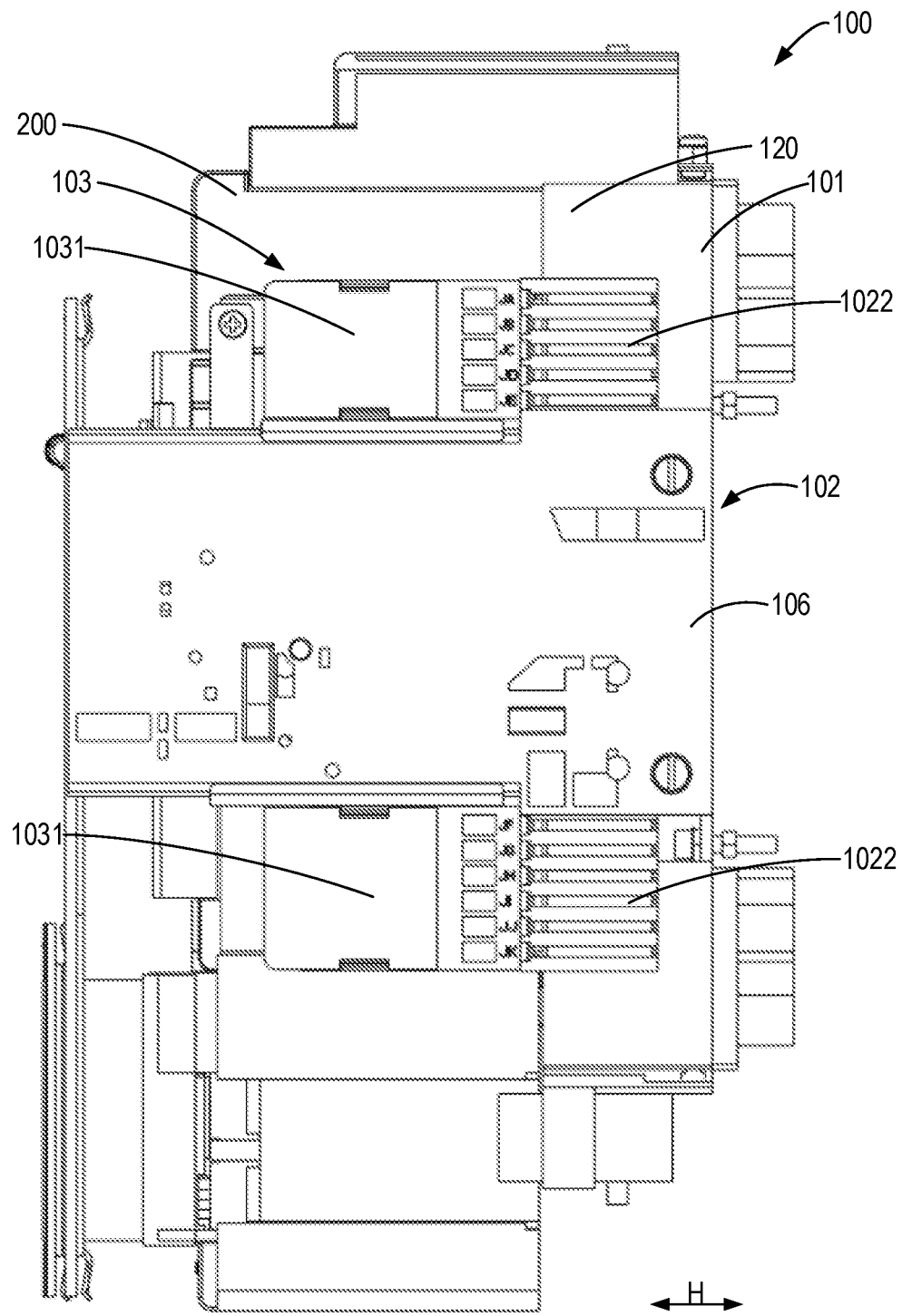

After the test of the switch 200 is completed, the user continues to operate the operating member 300 without performing any other additional operations, so that the second male contact 1082 may be brought into contact with the second female contact 120 on the base 101 to close the main circuit, as shown in FIG. 3B and FIG. 3C. This process will be further elaborated below. As may be seen from the above process, unlike the conventional withdrawable base module, the withdrawable base module 100 according to embodiments of the present disclosure makes it only necessary to operate the operation member 300 without additional human interventions, during the period from the time when the switch 200 is placed on the withdrawable base module 100 to the time when the main circuit is closed. This makes the installation and maintenance of the switch 200 more convenient, and reduces the work intensity and improves the efficiency.

In addition, the rocking in or out of the switch 200 is implemented without an additional access stroke, which effectively reduces the size of the withdrawable base module 100 or the size of the switchgear for receiving the withdrawable base module 100, and thereby can effectively reduce the size of the switchgear in which the withdrawable base module 100 is mounted.

It should be appreciated that the process of rocking the switch 200 out of the withdrawable base module 100 is similar to the process of rocking in. It is possible to sequentially open the main circuit of the switch and open the test circuit by only operating the operation member 300 reversely without additional human interventions. In the following description, the operation principle of the withdrawable base module 100 will be described by taking an example of the switch 200 being rocked in the withdrawable base module 100.

Figure 4A:
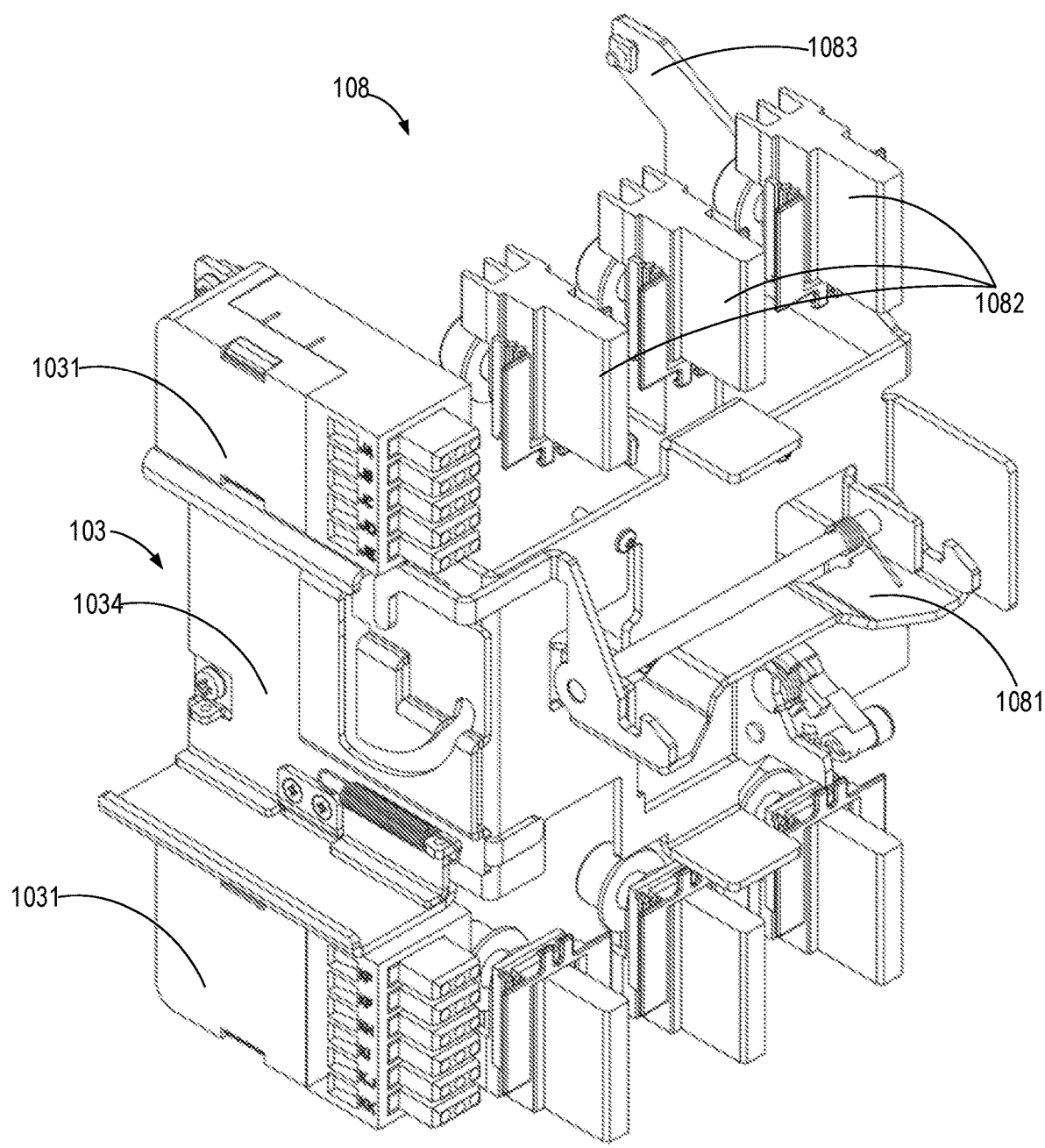
FIG. 4A to FIG. 4C illustrate perspective views of a mounting assembly of the withdrawable base module as viewed from different angles, according to exemplary embodiments of the present disclosure.
Figure 4B:
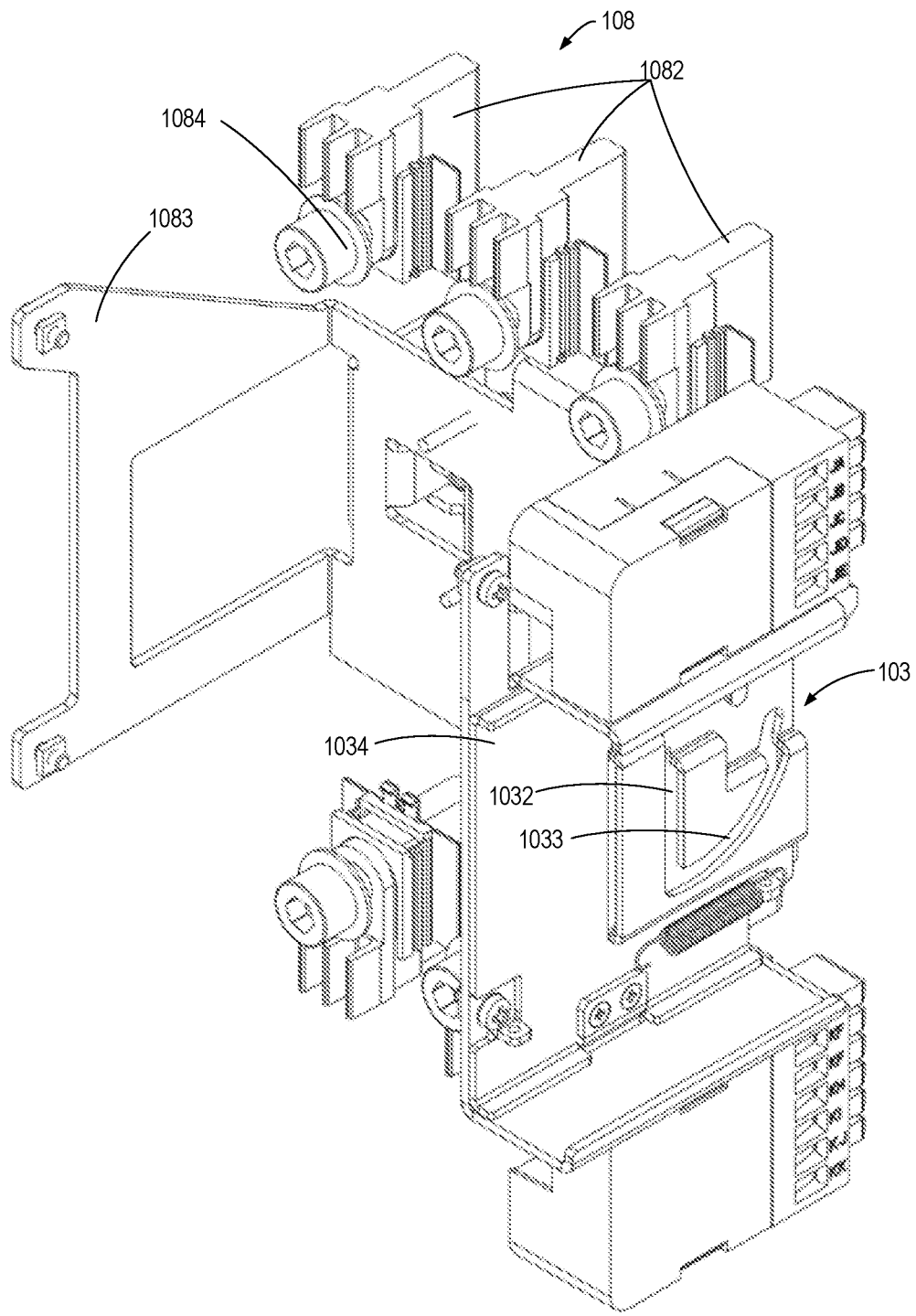
Figure 4C:
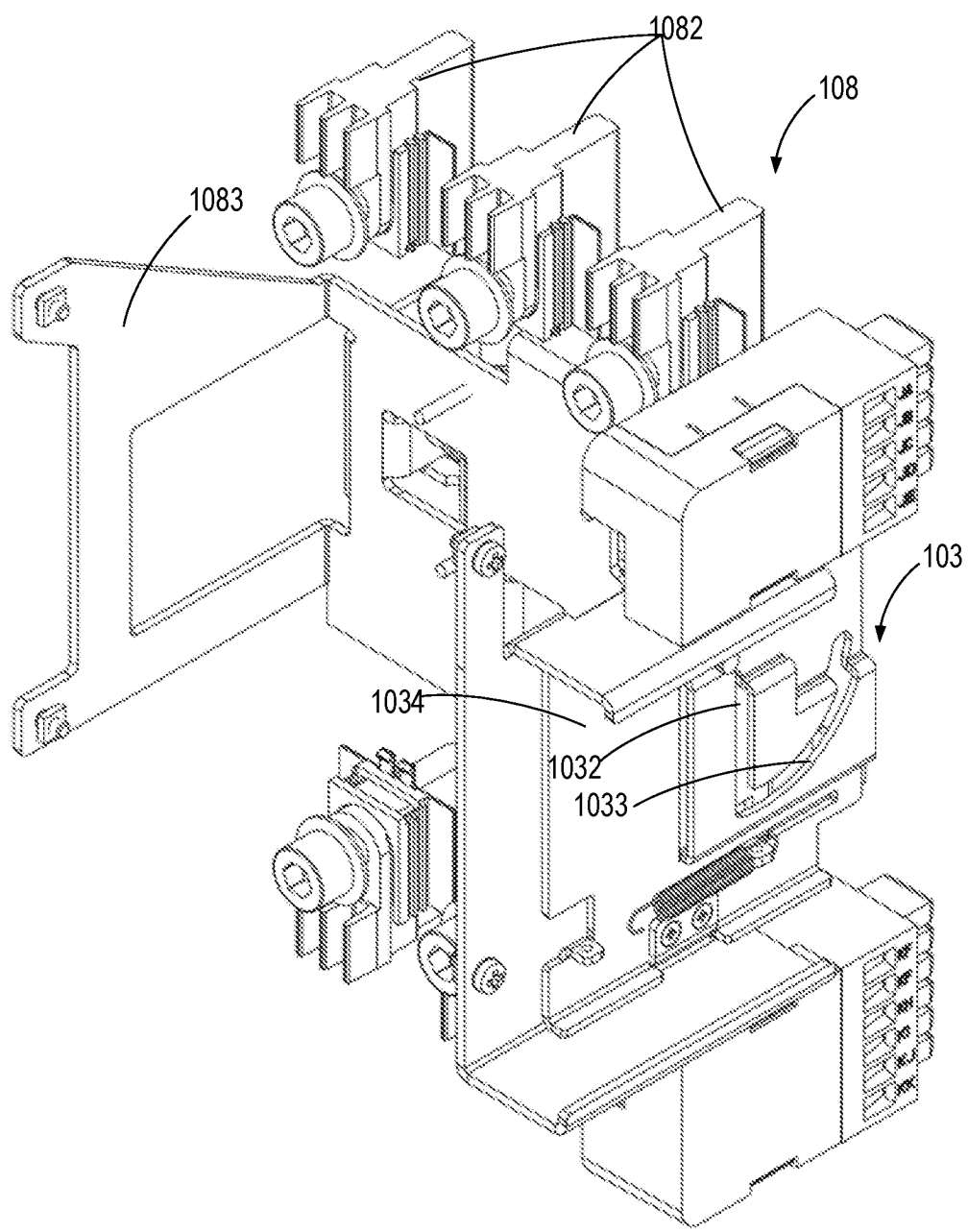

In some embodiments, the switch 200 is placed on the base 101 by a mounting assembly 10. A perspective view of the mounting assembly 108 is as shown in FIG. 4A through FIG. 4C. The mounting assembly 108 comprises a receiving portion 1083 for receiving the switch 200 and an engagement portion 1081 that can be coupled to the carrying mechanism 1023 as shown in FIG. 5. The receiving portion 1083 may be of a U-shaped shape or any other suitable shape. By providing the mounting assembly 108, on the one hand, it is possible to, by adjusting the structure of the receiving portion 1083, enable the base 101 to receive a plurality of types of switches 200, thereby improving the versatility of the withdrawable base module 100. On the other hand, the mounting assembly 108 has a structural strength that enables more stable engagement of the switch 200 and the withdrawable base module 100, thereby improving the stability of the switch 200 in use.

The second male contact 1082 may be disposed on the mounting assembly 108, and the contacts on the switch 200 may be coupled to the second male contact 1082 in a suitable manner such that the switch 200 is electrically connected with the busbar by causing the second female contact 120 to be in contact with the second male contact 1082, to close the main circuit. For example, as shown in FIG. 1, FIG. 2 and FIG. 3B, the contacts on switch 200 may be coupled to second male contacts 1082 by being pressed with a bolt 1084, so that the switch 200 may be more conveniently mounted to the receiving portion 1083 of the mounting assembly 108. It should be understood that the above embodiments where the contacts is coupled to the switch by being pressed with a bolt 1084 are merely exemplary and are not intended to limit the scope of the present disclosure. Any other suitable way is possible. For example, the contacts of switch 200 may be coupled to the mounting assembly 108 by plugging.

The auxiliary assembly 103 may be attached to the mounting assembly 108 and can move relative to the mounting assembly 108. In some embodiments, as shown in FIG. 2, the auxiliary assembly 103 may include an auxiliary drive plate 1034 for mounting the first male contact 1031, and the auxiliary assembly 103 may be attached to the mounting assembly 108 via the auxiliary drive plate 1034. FIG. 3A shows a state when the switch 200 has just been placed on the base 101 via the mounting assembly 108, and FIG. 3B shows that the drive mechanism 104 has driven the auxiliary assembly 103 to slide and driven the first female contact 1022 to contact the first male contact 1031. It can be seen that in this manner, the auxiliary assembly 103 may slide relative to the mounting assembly 108, and during the process that the test circuit is closed, the mounting assembly 108 and the switch 200 thereon are stationary, thereby ensuring that the first male contact 1031 contacts the first female contact 1022 without the main circuit.

Figure 6:
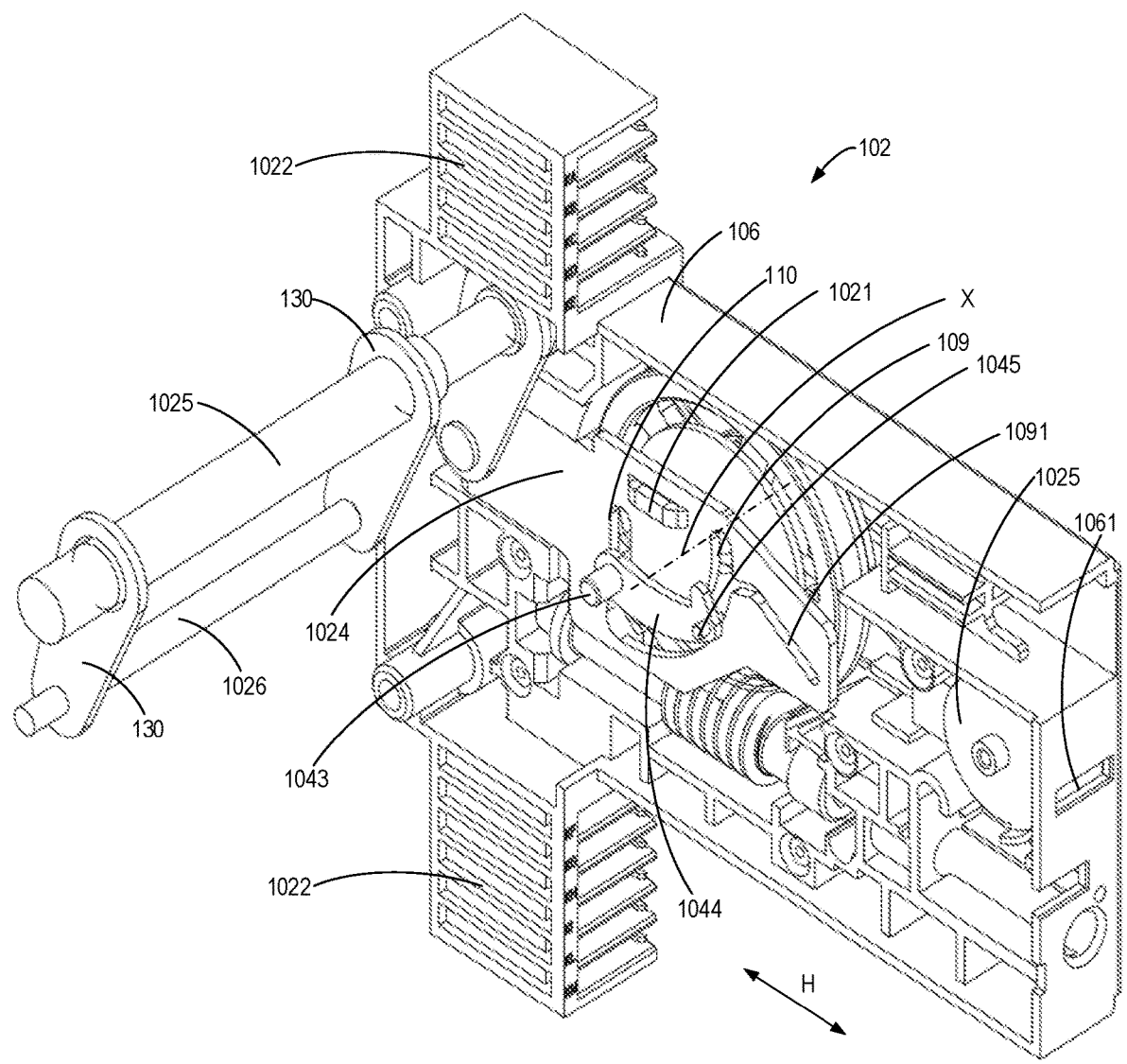
FIG. 6 illustrates a perspective view of a conversion assembly of the withdrawable base module as viewed from another angle, according to exemplary embodiments of the present disclosure.

FIG. 5 shows a perspective view of the conversion assembly 102 of the withdrawable base module 100, and FIG. 6 shows a perspective view of the conversion assembly 102 as viewed from another angle. As shown in FIG. 5 and FIG. 6, in some embodiments, the carrying mechanism 1023 comprises a rotating shaft 1025 and a bearing portion 1026. The rotating shaft 1025 is pivotally arranged on the housing 106 of the conversion assembly 102. The bearing portion 1026 is rotatable about the rotating shaft 1025, and the engaging portion 1081 of the mounting assembly 108 as shown in FIG. 4A may be hooked on the bearing portion 1026 such that the rotation of the bearing portion 1026 about the rotating shaft 1025 may drive the switch 200 to move towards the base 101 to close the main circuit.

As shown in FIG. 5 and FIG. 6, in some embodiments, the bearing portion 1026 and the rotating shaft 1025 may be connected with each other by a connecting sheet 130 to achieve the above-described effect that the bearing portion 1026 rotates about the rotating shaft 1025. As shown, the bearing portion 1026 and the rotating shaft 1025 may be connected with each other through corresponding holes in an upper surface of the connecting sheet 130, respectively. In this way, the bearing portion 1026 and the rotating shaft 1025 may be connected with each other in an easy-to-assemble manner.

It should be understood that the manner in which the bearing portion 1026 and the rotating shaft 1025 are connected with each other by the connecting sheet 130 is merely exemplary and is not intended to limit the scope of protection of the present disclosure. Any other suitable connection manners are also possible. The bearing portion 1026 and the rotating shaft 1025 may also be connected with each other by a connecting plate or a connecting rod or the like.

In some embodiments, the bearing portion 1026 may be driven to rotate by a switch drive plate 1024 of the conversion assembly 102. The switch drive plate 1024 is disposed inside the conversion assembly 102 with one end of the bearing portion 1026 being coupled to the switch drive plate 1024, as shown in FIG. 6. Furthermore, an auxiliary drive plate 1034 of the auxiliary assembly 103 as shown in FIG. 4A to FIG. 4C is disposed outside the conversion assembly 102 and parallel to the switch drive plate 1024. After the test circuit is closed and the corresponding test operation is completed, the drive mechanism 104 is further actuated by the operating member 300 as shown in FIG. 1 to drive the switch drive plate 1024 to move, so that the bearing portion 1026 is driven to rotate, thereby driving the mounting assembly 108 thereon and the switch 200 to move to close the main circuit, as shown in FIG. 4B and FIG. 4C.

In this way, the drive mechanism 104 according to embodiments of the present disclosure may be operated by the operating member 300 to sequentially drive the auxiliary assembly 103 and the switch drive plate 1024 to move to close the test circuit and the main circuit in succession. FIG. 2 shows a perspective view of an interior of the conversion assembly 102, and FIG. 7 shows an side view of the interior of the conversion assembly 102 of the withdrawable base module 100, wherein it specifically shows the drive mechanism 104 in accordance with some exemplary embodiments of the present disclosure.

Figure 7:
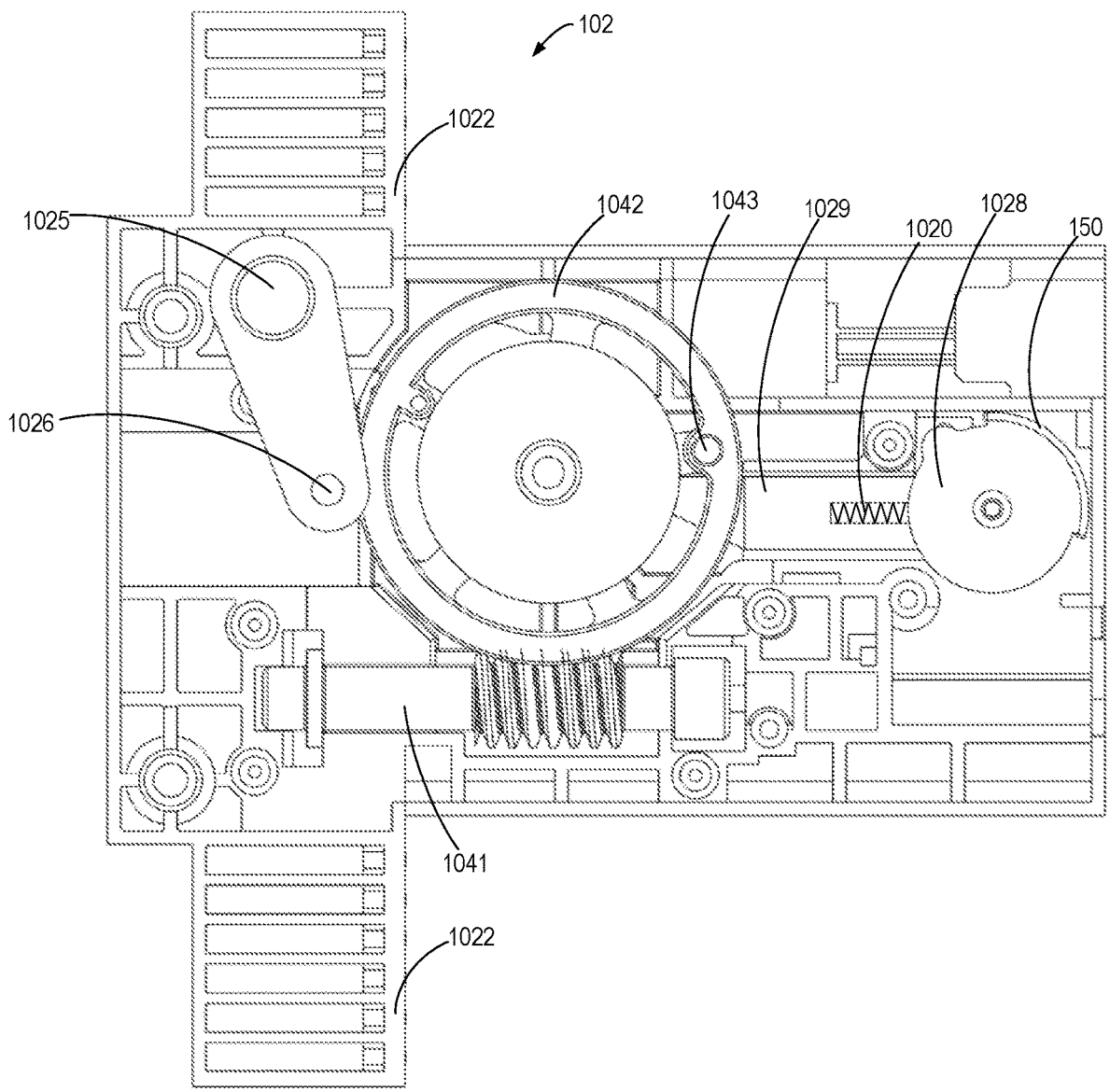
FIG. 7 illustrates an internal side view of a conversion assembly of the withdrawable base module according to exemplary embodiments of the present disclosure.

As shown in FIG. 2 and FIG. 7, in some embodiments, the drive mechanism 104 comprises a worm 1041 and a worm gear 1042 that are coupled to each other. The worm 1041 can be operated by the operating member 300 to rotate about its own axis, thereby causing the worm gear 1042 to rotate about an axis X perpendicular to the worm 1041. In some embodiments, an end of the worm 1041 may have a hex nut head, and the operating member 300 may be an Allen wrench to rotate the worm 1041 by inserting the operating member 300 into the hex nut head.

It should be understood that the manner in which the worm 1041 is driven is merely exemplary and is not intended to limit the scope of the disclosure. Any other suitable structures are also possible. For example, in some embodiments, the worm 1041 may also be driven by a motor (not shown) in response to a predetermined signal.

As shown in FIG. 2 and FIG. 7, in some embodiments, the drive mechanism 104 may also comprise a drive pin 1043 that is arranged on a circumference of the worm gear 1042 and extends parallel to the axis X. The drive pin 1043 is rotatable about the axis X as the worm wheel 1041 rotates. As shown in FIG. 2, FIG. 4B and FIG. 4C, the auxiliary drive plate 1034 comprises an auxiliary drive straight groove 1032 formed thereon. The auxiliary drive straight groove 1032 extends in a direction (referred to as a second direction V for ease of discussion) perpendicular to a direction (referred to as a first direction H for ease of discussion) of movement of the auxiliary drive plate 1034.

Referring back to FIG. 6, the switch drive plate 1024 comprises a main arcuate groove 109 formed thereon. A center of the main arcuate groove 109 is located on the axis X such that sliding of the drive pin 1043 within the main arcuate groove 109 does not drive the switch drive plate 1024 to move. The drive pin 1043 may slide in the auxiliary drive straight groove 1032 through the main arcuate groove 109, thereby causing the auxiliary drive plate 1034 to slide in the first direction H.

FIGS. 8A to 11C show perspective views and side views of the withdrawable base module 100 during the switch 200 being rocked in. FIG. 3A, FIG. 3B, FIG. 8A, FIG. 8B, FIG. 9A, FIG. 9B, FIG. 10A, FIG. 10B, FIG. 11A and FIG. 11B respectively show a process in which the drive assembly 104 drives the auxiliary drive plate 1034 to cause the first male contact 1031 to contact the first female contact 1022. It may be seen that while the auxiliary drive plate 1034 slides along the first direction H to drive the first male contact 1031 to contact the first female contact 1022, since the drive pin 1043 slides within the main arcuate groove 109, the drive pin 103 does not drive the switch drive plate to slide, thereby not driving the switch 200 thereon to slide toward the base 101.

Returning to FIG. 2, FIG. 4B, FIG. 4C and FIG. 6, the switch drive plate 1024 further includes a main arcuate straight groove 110 that is in communication with the main arcuate groove 109 and extends in the second direction V, and the auxiliary drive plate 1034 further comprises an auxiliary arcuate groove 1033 formed thereon which is in communication with the auxiliary drive straight groove 1032. A center of the auxiliary arcuate groove 1033 is located on the axis X. After the drive pin 1043 of the driving assembly 104 drives the auxiliary drive plate 1034 to move to cause the first male contact 1031 to contact the first female contact 1022, the drive pin 1043 will be in a state where the drive pin 1043 has already slid along the auxiliary drive straight groove 1032 to the end of the auxiliary drive straight groove 1032 and slid into the auxiliary curved groove 1033. In the meantime, the driven pin 1043 slides along the main arcuate groove 109 to the end of the arcuate groove 109 and slides into the main drive straight groove 110, as shown in FIG. 3B, FIG. 8B, FIG. 9B, FIG. 10B and FIG. 11B.

In this case, as the operating member 300 is further operated, the drive pin 1043 will further rotate about the axis X. The sliding of the drive pin 1043 within the main drive straight groove 1032 may drive the switch drive plate 1024 to move, thereby driving the bearing portion (shaft) 1026 to rotate to drive the mounting assembly 108 and the switch 200 thereon to move towards the base 101 and close the main circuit. At the same time, since the drive pin 1043 slides in the auxiliary arcuate groove 1033, it does not drive the auxiliary drive plate 1034 to further move, and finally the state shown in FIG. 3C, FIG. 8C, FIG. 9C, FIG. 10C, and FIG. 11C is reached.

It can be seen from the above that in some embodiments, sequential turn-on of the test circuit and the main circuit is achieved by providing the main arcuate groove 109, the main drive straight groove 110, the auxiliary arcuate groove 1033, and the auxiliary drive straight groove 1032, and the drive pin 1043 sliding therein and rotating about the axis X. Further, the switch drive plate 1024 and the drive mechanism 104 are at least partially disposed in the housing 106. It may be seen that the above functions are realized by a simple and compact structure, so that the withdrawable base module 100 according to an embodiment of the present disclosure occupies small room and is more convenient to be installed in the switchgear.

It should be understood that the above-described embodiments in which the test circuit and the main circuit are sequentially turned on through groove-and-pin cooperation are merely illustrative and are not intended to limit the scope of the disclosure. Any other suitable structures or arrangements are also possible. For example, in some embodiments, the above functions may also be achieved by means of a link fit.

Figure 8A:
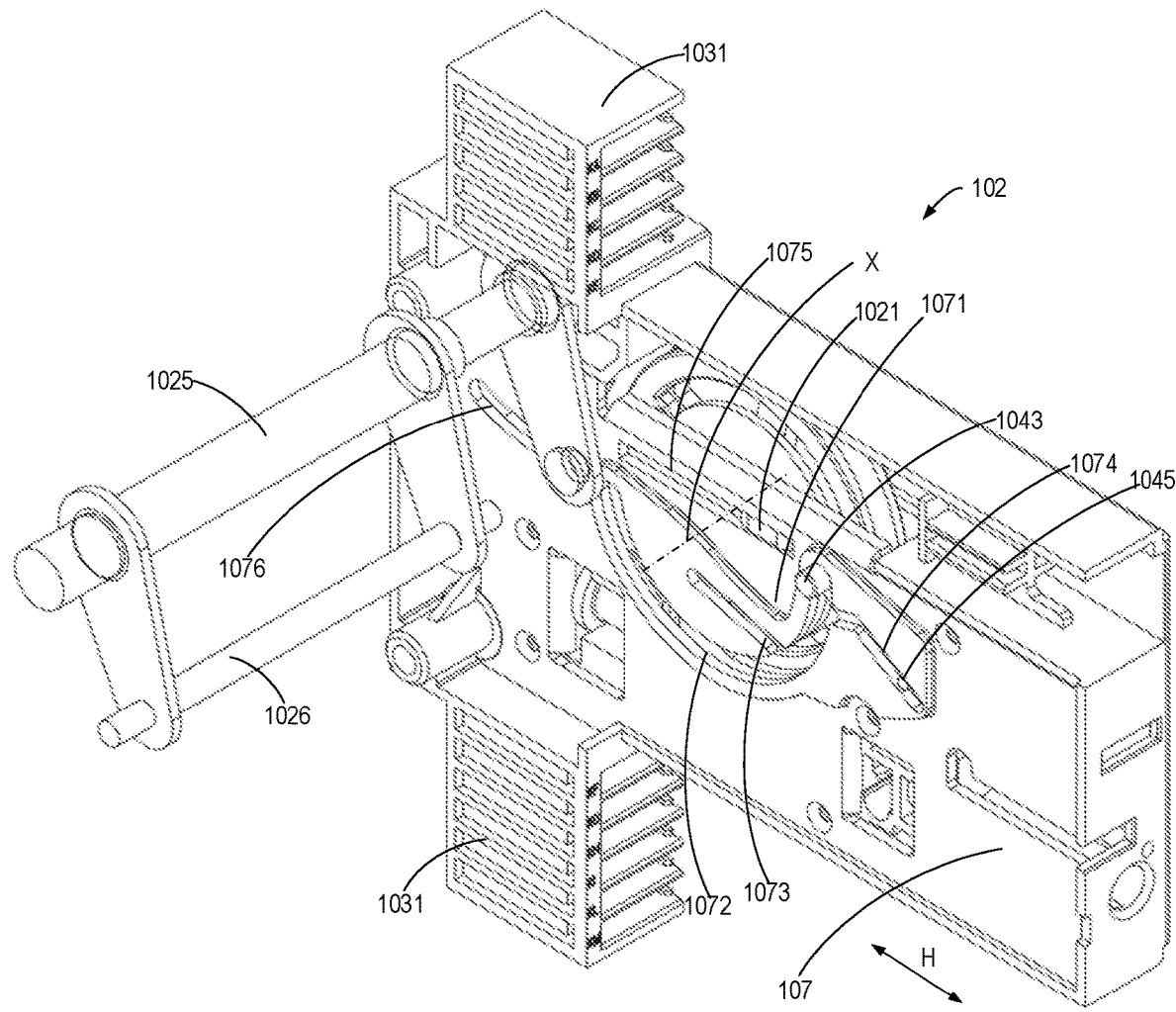
FIG. 8A to FIG. 8C illustrate perspective views of a process of using the conversion assembly of the withdrawable base module according to example embodiments of the present disclosure to rock in the switch.
Figure 8B:
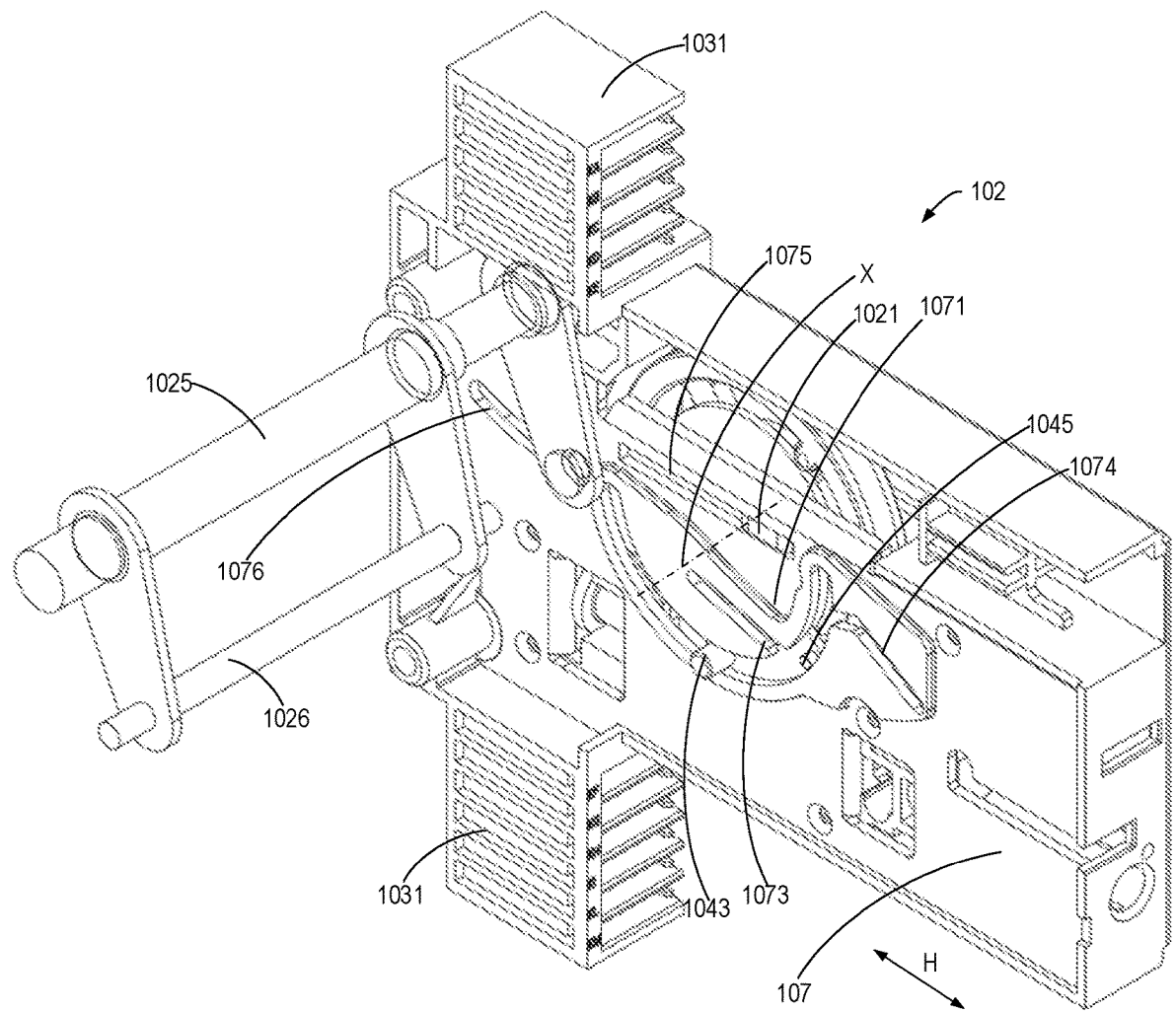

In some embodiments, as shown in FIG. 4A and FIG. 8A, the conversion assembly 102 further includes a cover 107 for at least partially closing the housing 106. The cover 107 is disposed between the switch drive plate 1024 shown in FIG. 6 and the auxiliary drive plate 1034 shown in FIG. 4A, and is parallel to the two, respectively. An arcuate guide groove (referred to as a first arcuate guide groove 1072 for ease of discussion) is provided at a corresponding position on the cover 107. The first arcuate guide groove 1072 overlaps the main arcuate groove 109 and the auxiliary arcuate groove 1033, and its center is located on the axis X to provide guidance for the drive pin 1043 during rotation.

It should be understood that the withdrawable base module 100 may be mounted in the switchgear in any suitable manner. If the withdrawable base module 100 is installed in the switchgear in a vertical state, the switch 200 may cause the carrying shaft 1026 to rotate due to its own gravity after the test circuit is turned on and before the main circuit is turned on. The carrying shaft 1026 in turn drives the switch drive plate 1024 to move, thereby misaligning the switch drive plate 1024 and the auxiliary drive plate 1034. This situation might make it impossible to achieve the process of driving the drive pin 1043 to drive the switch drive board 1024 and the auxiliary drive plate 1034.

Figure 9A:
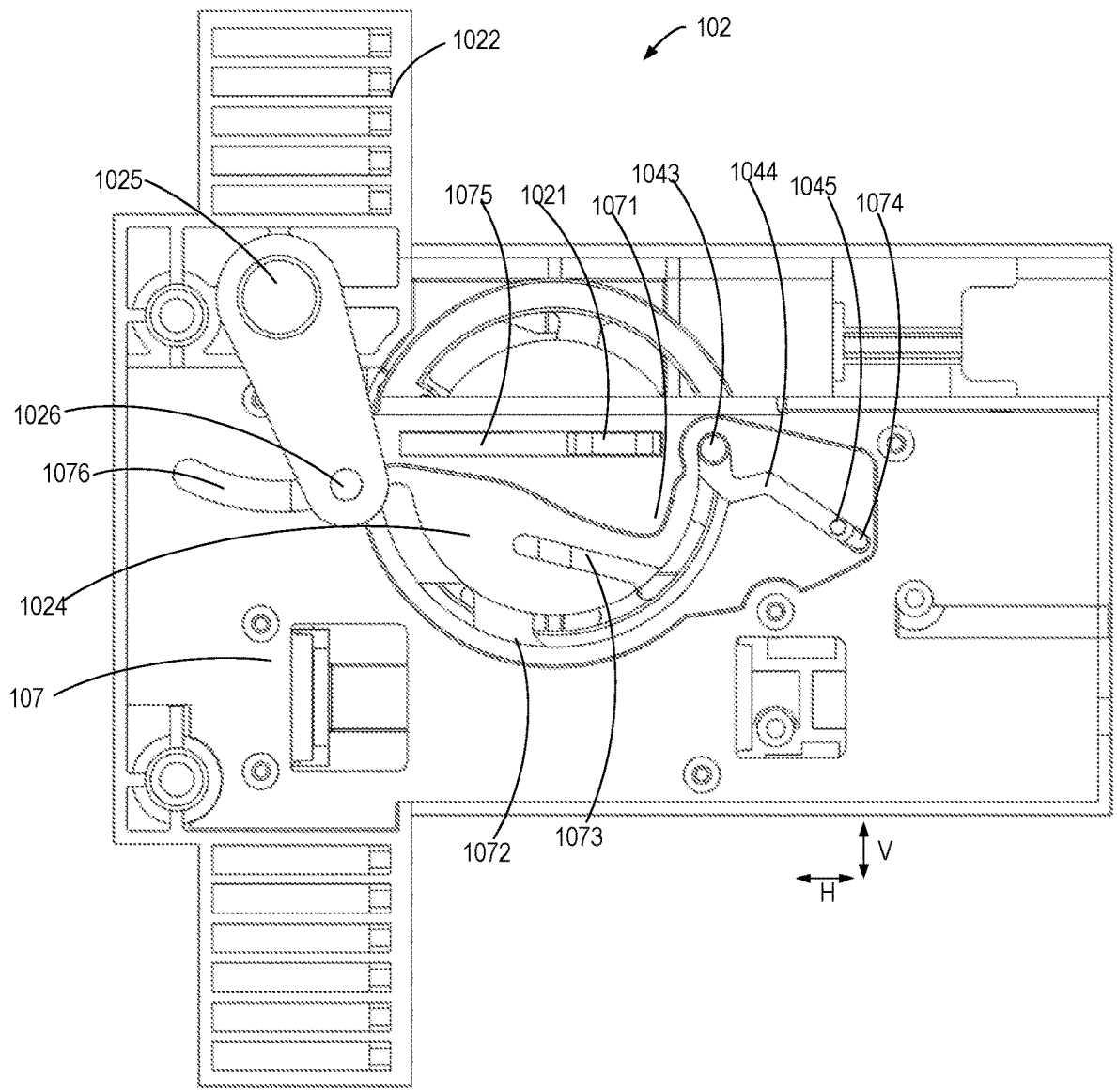
FIG. 9A to FIG. 9C illustrate side views of a process of using the conversion assembly of the withdrawable base module according to example embodiments of the present disclosure to rock in the switch.
Figure 9B:
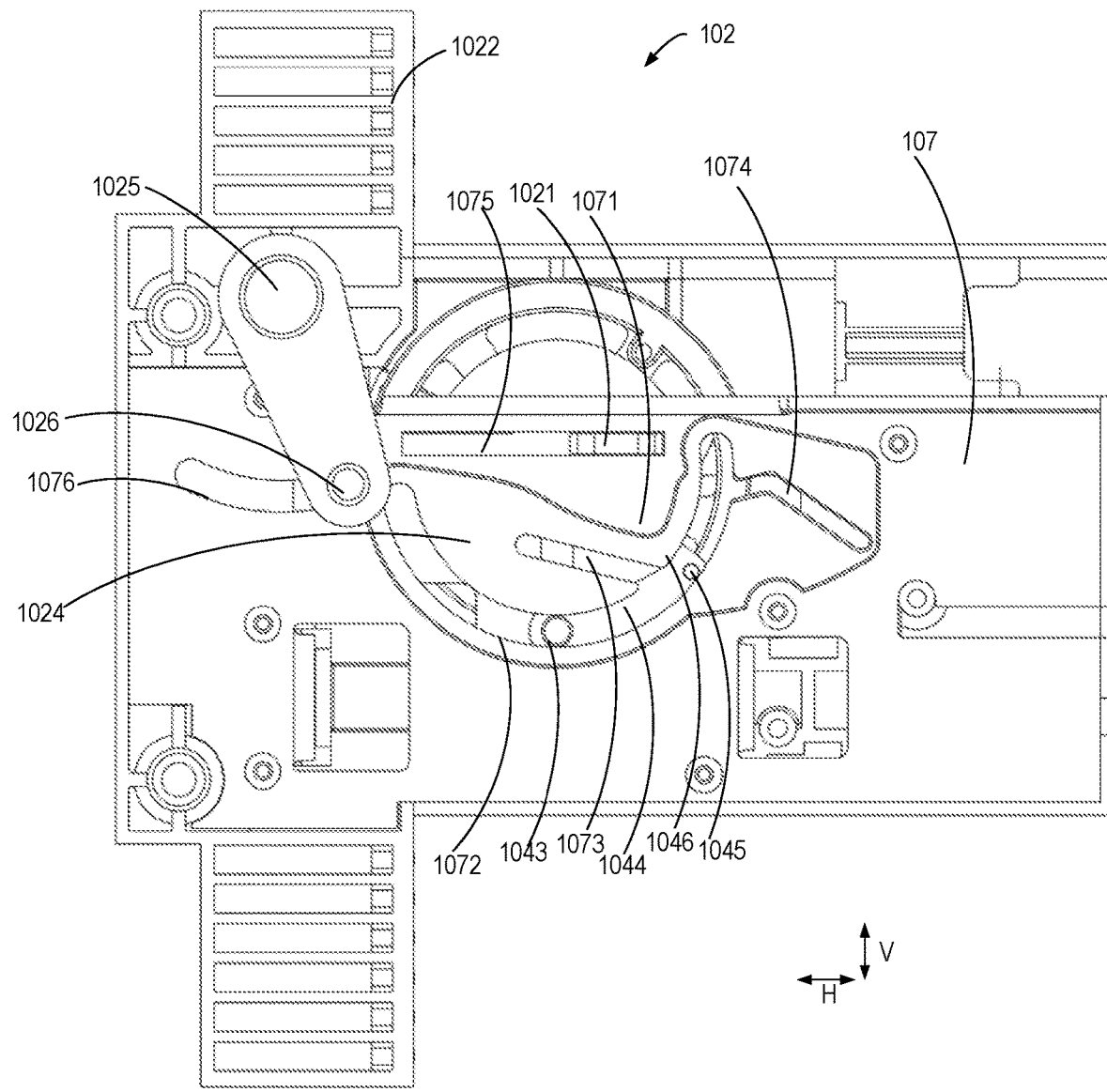
Figure 10A:
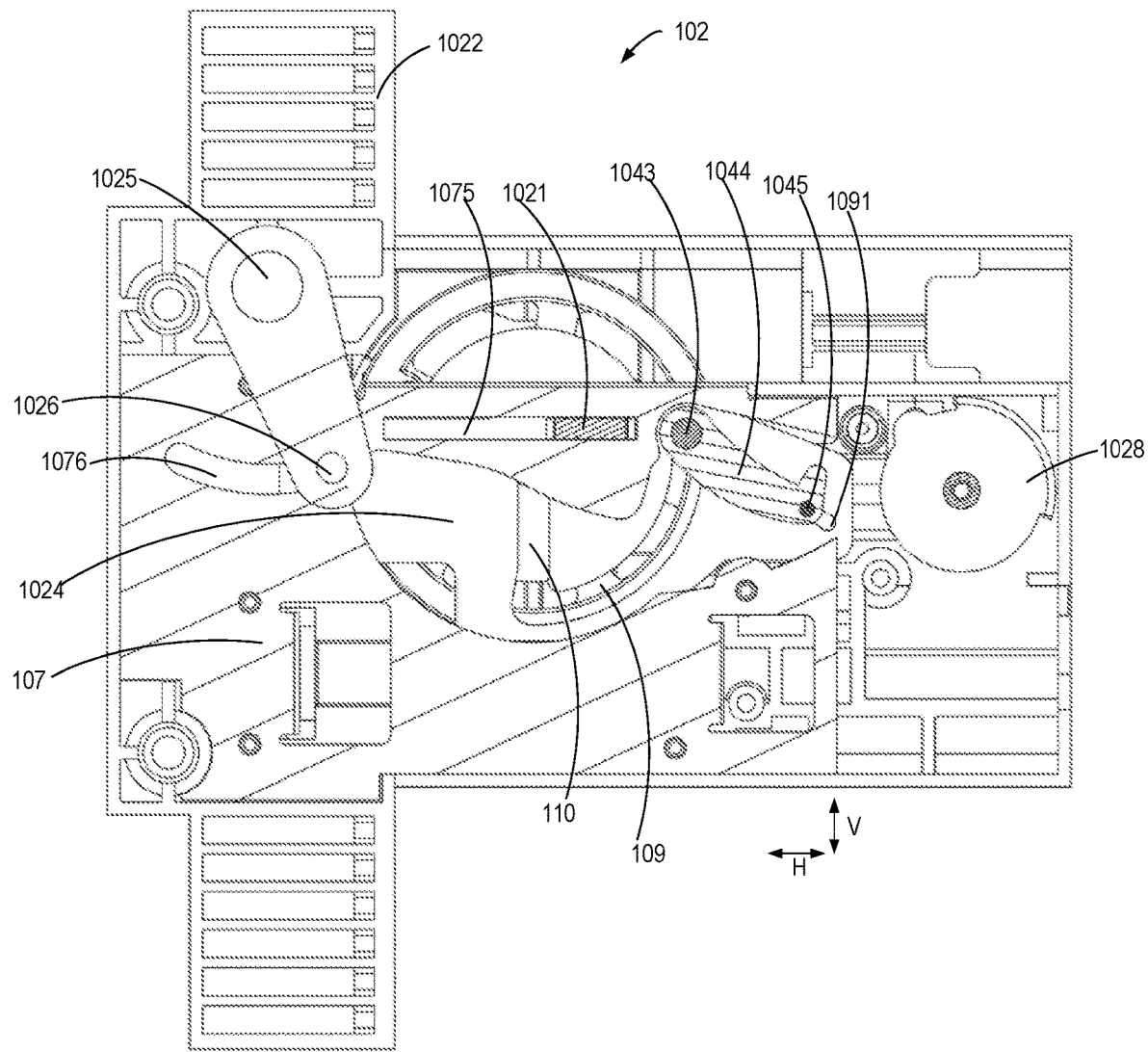
FIG. 10A to FIG. 10C illustrate internal side views of a process of using the conversion assembly of the withdrawable base module according to example embodiments of the present disclosure to rock in the switch.
Figure 10B:
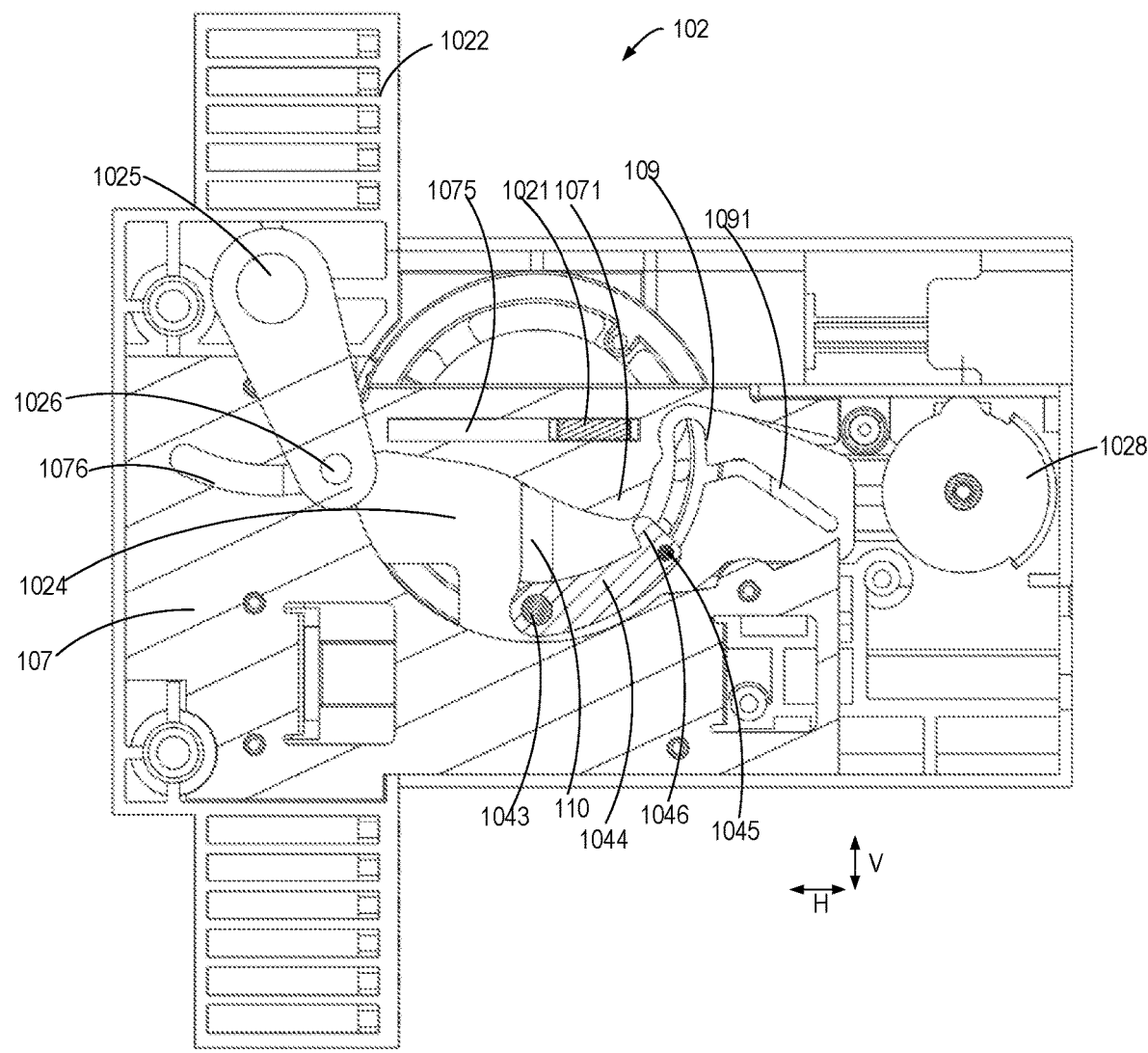
Figure 10C:
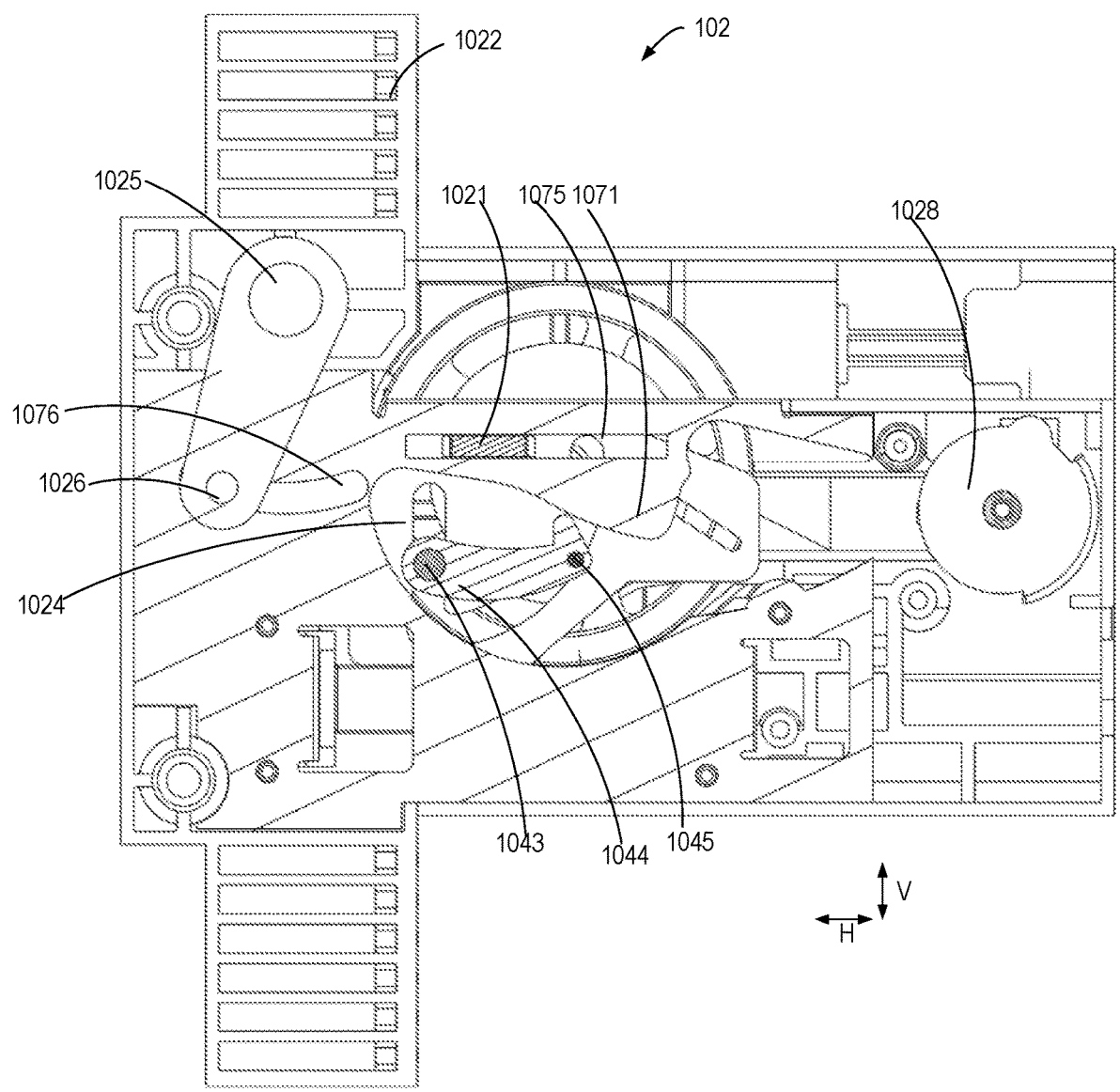

In view of this case, in some embodiments, as shown in FIG. 9B and FIG. 10B, the cover 107 is formed with a stopping portion 1071 that protrudes toward the switch drive plate 1024. The stopping portion 1071 may be formed in any suitable manner, such as by stamping or the like. The drive mechanism 104 also includes a self-locking mechanism 1044 that is pivotally disposed on the drive pin 1043. The self-locking mechanism 1044 includes a self-locking pin 1045 and a projection 1046 that projects toward the axis X.

With the above structure, after the test circuit is turned on, i.e., when the drive pin 1043 slides along the main arcuate groove 109 to the end of the main arcuate groove 109, as shown in FIG. 9B and FIG. 10B, the self-locking pin 1045 will abut against a side wall of the main arcuate groove 109, and the projection 1046 is blocked by the stopping portion 1071.

In this case, since the cover 107 is stationary, the projection 1046 is blocked by the stopping portion 1071 on the cover 107, and the self-locking pin 1045 abuts against the side wall of the main arcuate groove 109 of the switch drive plate 1024. Therefore, even if the gravity of the switch 200 applies a force to the carrying shaft 1026 to rotate it, the switch drive plate 1024 does move in the first direction H due to the interaction of the stopping portion 1071, the self-locking pin 1045 and the side wall of the main arcuate groove 109. The above structure ensures that regardless a state in which the withdrawable base module 100 is installed in the switchgear, the switch drive plate 1024 and the auxiliary drive plate 1034 and the respective grooves thereon are not misaligned. This also ensures that the withdrawable base module 100 can smoothly allow the test circuit and the main circuit to turn on sequentially.

The above process describes that by virtue of the self-locking mechanism 1044 and the stopping portion 1071, the switch drive plate 1024 does not undergo undesired movement due to the gravity of the switch 200. However, in the case where the drive pin 1043 drives the switch drive plate 1024 to move in the first direction H, the self-locking mechanism 1044 will drive the self-locking pin 1045 not to abut against the side wall of the main arcuate groove 109. Therefore, in the case where the drive pin 1043 drives the switch drive plate 1024 to move, the self-locking mechanism 1044 does not restrict the sliding of the switch drive plate 1024.

Figure 8C:
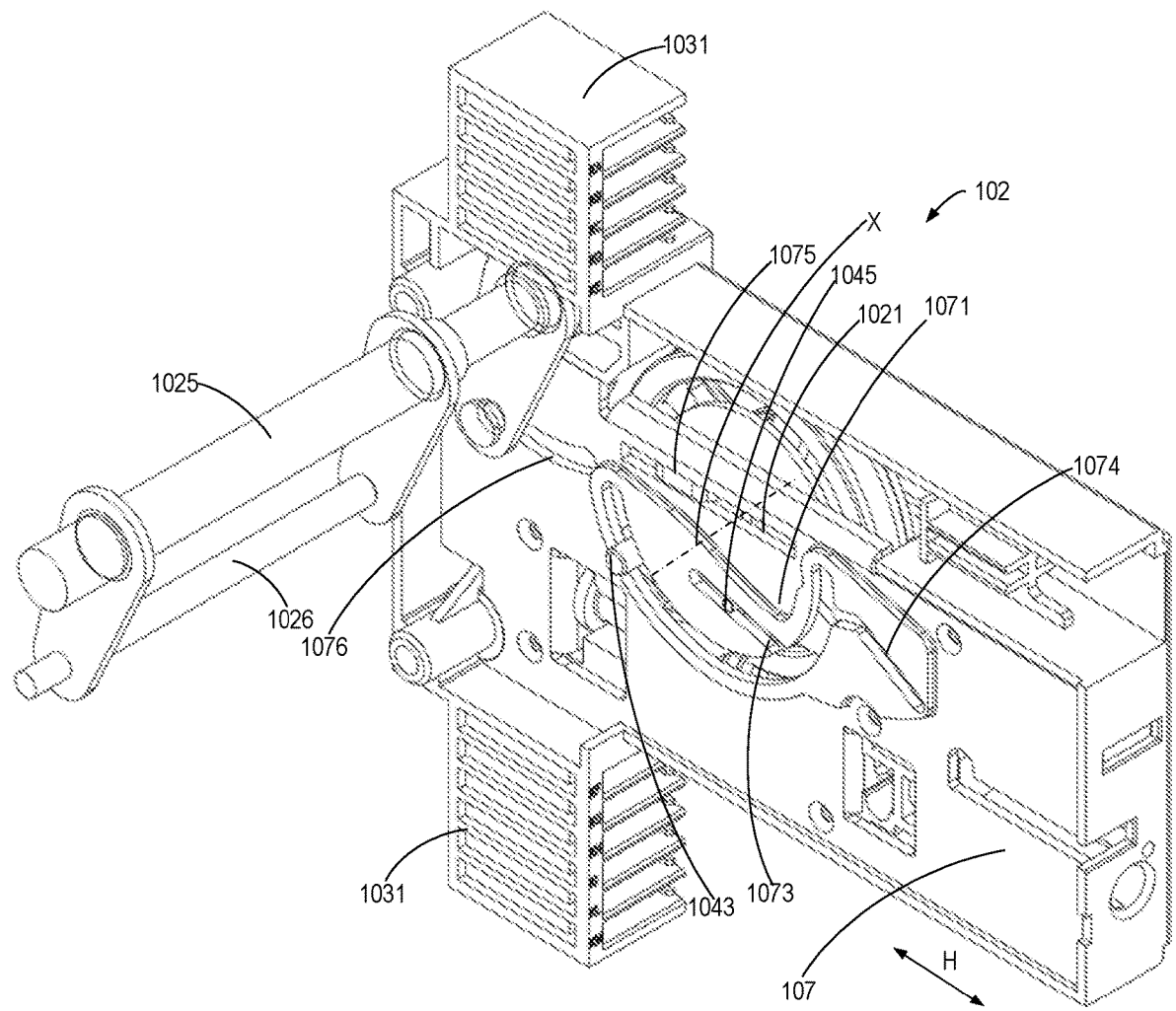

Since the self-locking mechanism 1044 itself also has a certain self-weight, if it is not limited, in some states, the self-weight of the self-locking mechanism 1044 may also cause undesired movement of the self-locking mechanism, thereby affecting the self-locking. performance and the rocking-in and rocking-out of the switch 200. Therefore, in order to avoid positional misalignment due to the self-weight of the self-locking mechanism 1044, in some embodiments, an inner chute 1073 is formed on an inner side wall which is of the first arcuate guide groove 1072 of the cover 107 and adjacent to the axis X, as shown in FIG. 8C. The inner chute 1073 generally extends in the first direction H and slightly toward the axis X.

When the drive pin 1043 drives the switch drive plate 1024, the inner chute 1073 ensures that the self-locking mechanism 1044 may move in a desired posture. In addition, since the drive pin 1043 drives the self-locking pin 1045 to rotate via the self-locking mechanism 1044, the self-locking pin 1045 also undergoes a certain translational movement along with the switch drive plate 1024. Therefore, the inner chute 1073 is provided so that the self-locking pin 1045 may slide along the inner chute 1073 during the process that the drive pin 1043 drives the switch drive plate 1024 to move in the first direction H.

Figure 11A:
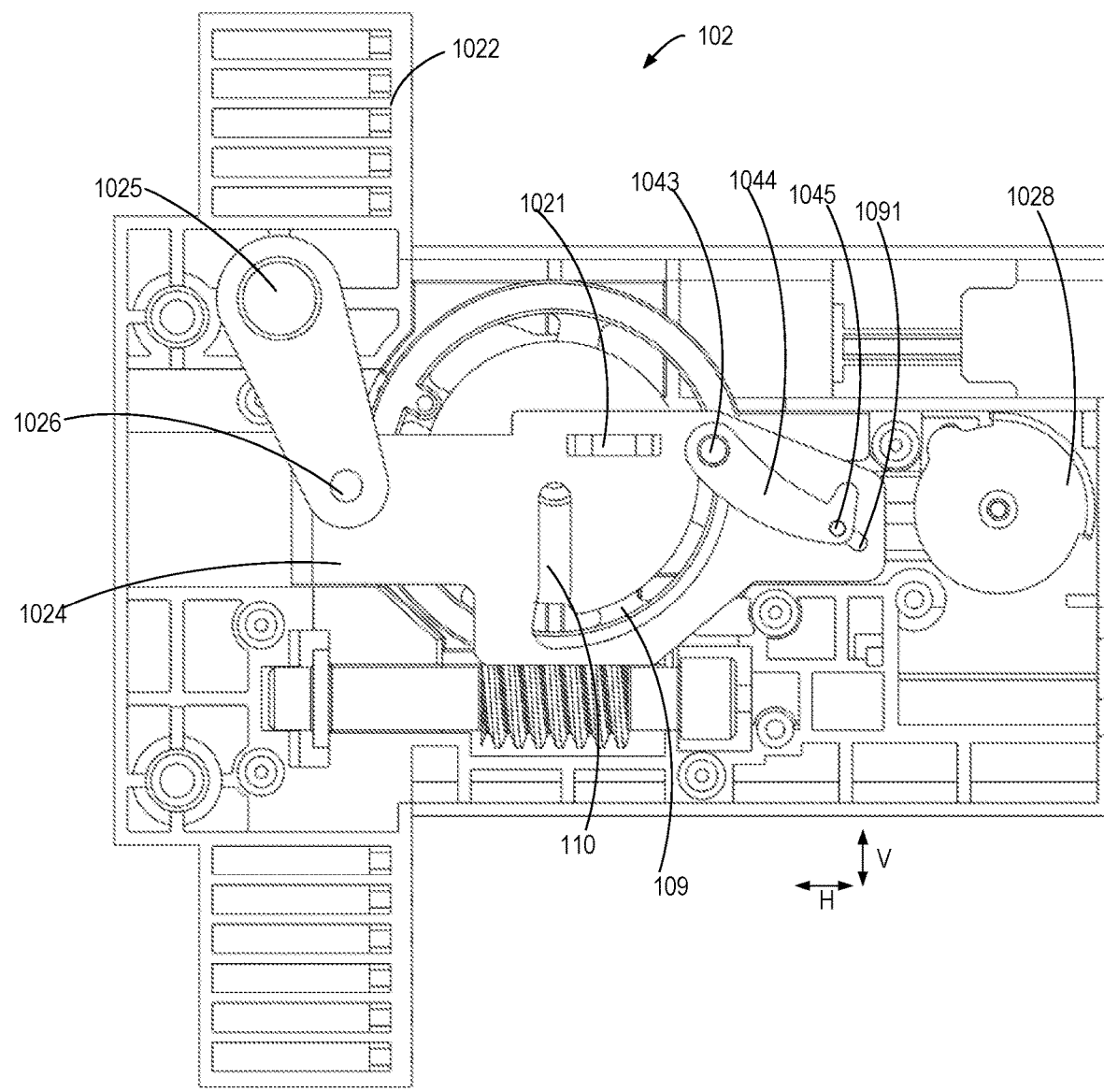
FIG. 11A to FIG. 11C illustrate internal side views of a process of using the conversion assembly of the withdrawable base module according to example embodiments of the present disclosure to rock in the switch, wherein a cover of the conversion assembly is omitted.
Figure 11B:
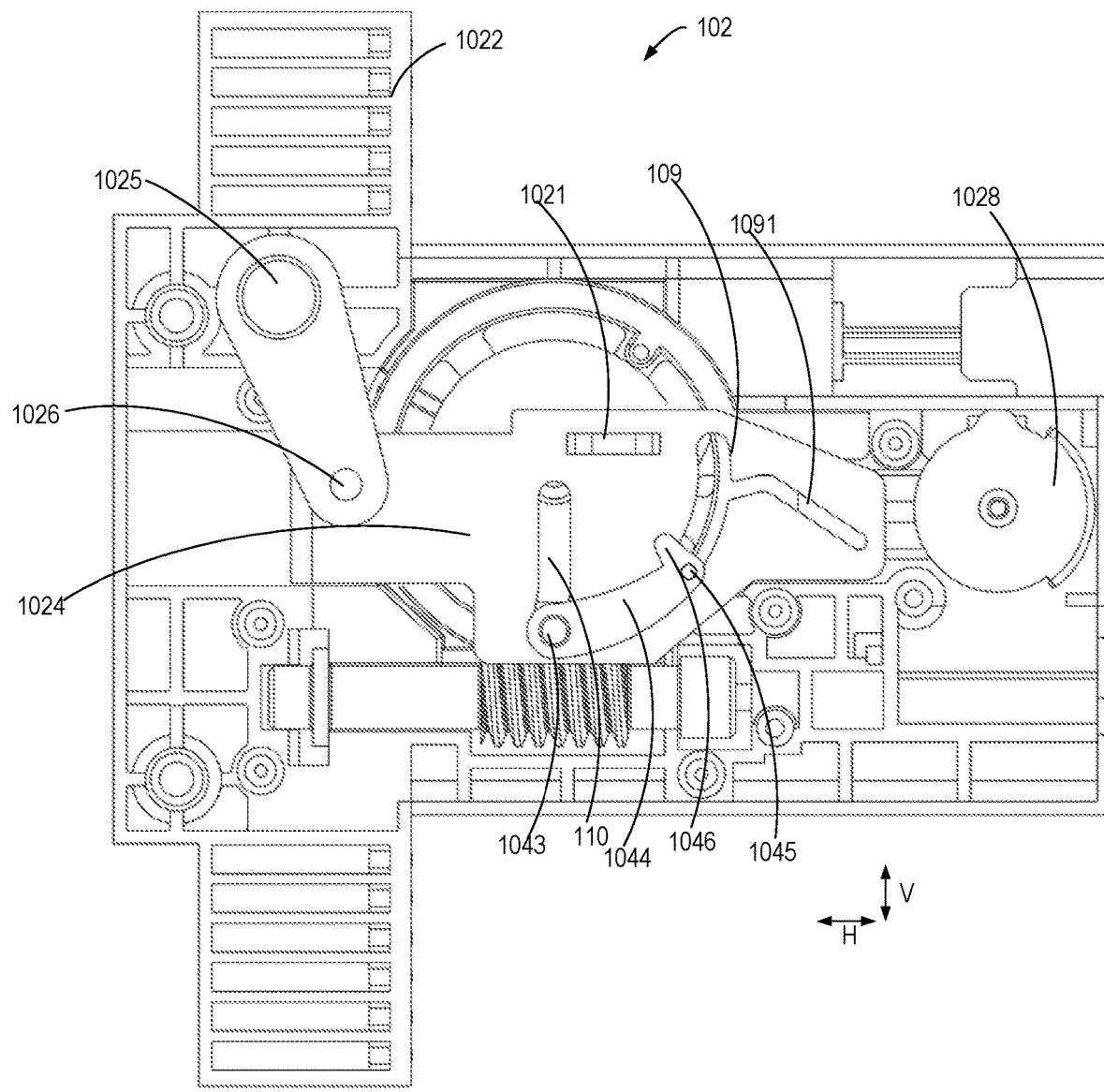
Figure 11C:
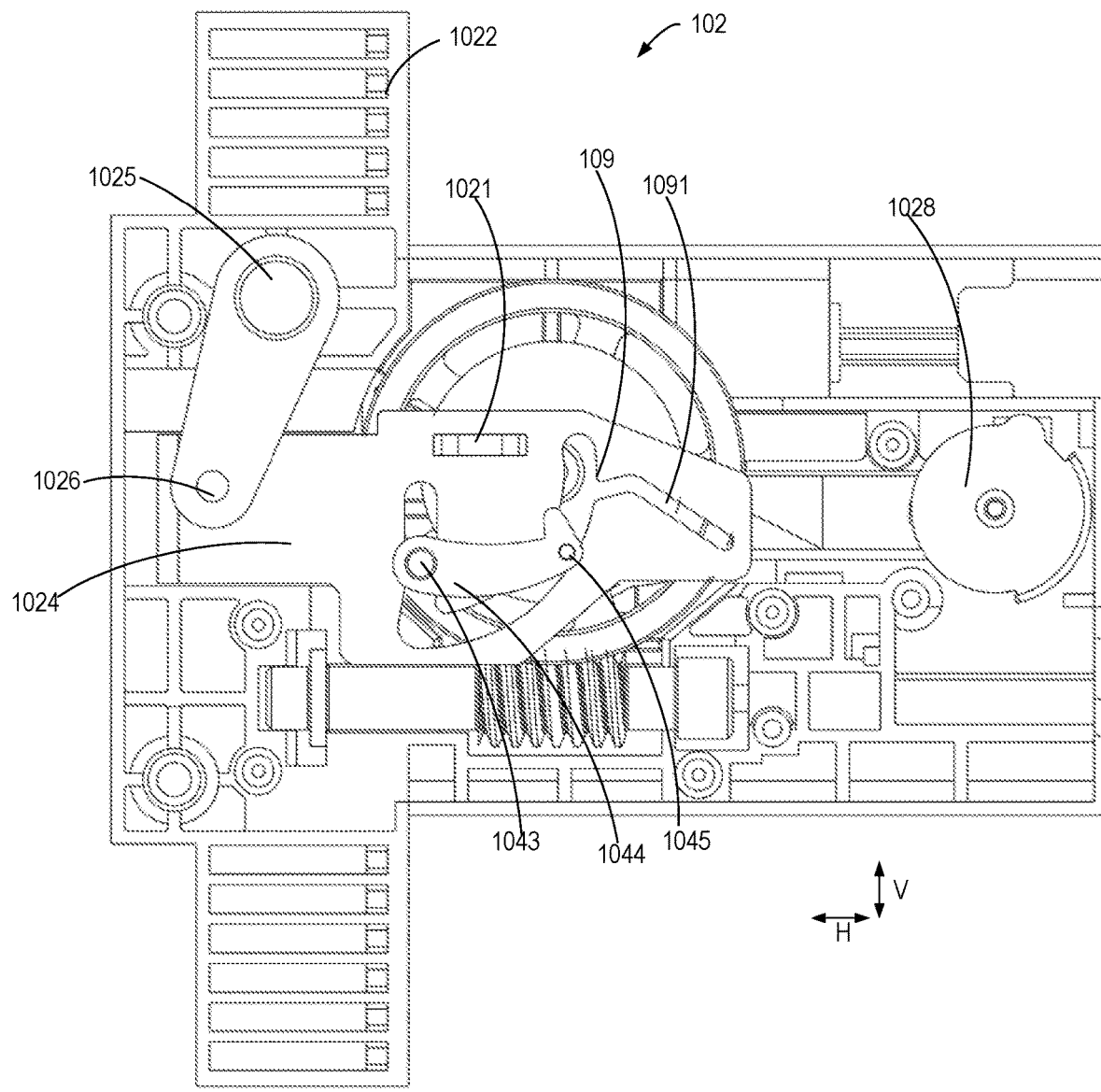

In some embodiments, an outer chute 1074 is formed on an outer sidewall of the first arcuate guide groove 1072 away from the axis X, and the outer chute 1074 extends away from the axis X, as shown in FIG. 8C. Correspondingly, a main chute 1091 overlapping the outer chute 1074 is also provided on the switch drive plate 1024, as shown in FIG. 11A and FIG. 11B. While the drive pin drives the auxiliary drive plate 1034 to move, that is, during the movement from FIG. 11A to FIG. 11B, the mutually-overlapping main chute 1091 and outer chutes 1074 ensure that the self-locking mechanism 1044 may move in a desired posture.

As can be seen from the above, it is possible to, by providing the inner chute 1073, the main chute 1091 and the outer chute 1074, ensure that the self-locking mechanism 1044 moves in a desired posture. Therefore, with the above structure, it is possible to realize that the drive pin 1043 sequentially drives the switch drive plate 1024 and the auxiliary drive plate 1034 to move, respectively, without requiring additional intervention. This significantly improves the convenience of rocking the switch 200 into the withdrawable base module 100.

Figure 9C:
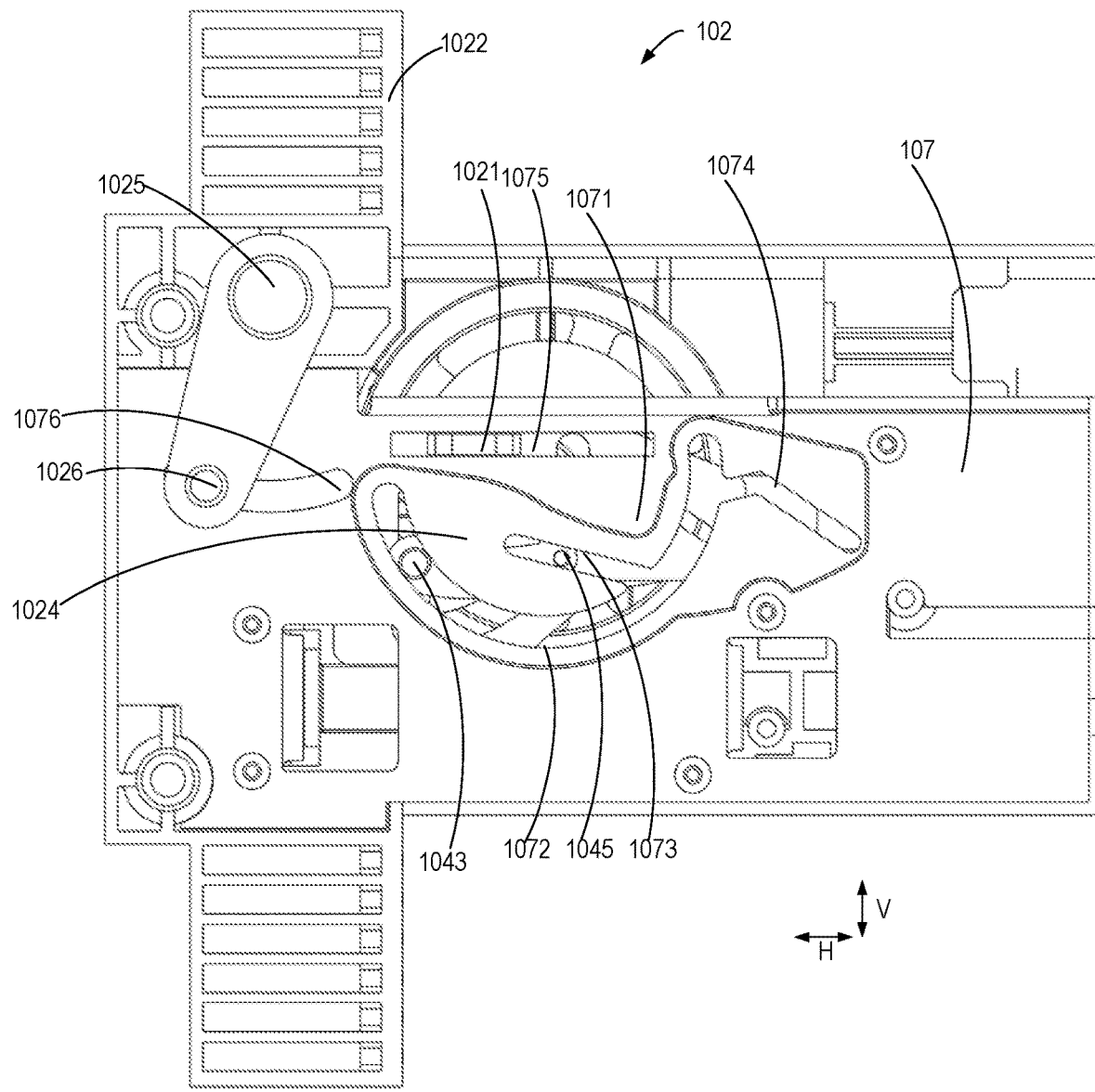

In some embodiments, the cover 107 may further include an arcuate guide groove (referred to as a second arcuate guide groove 1076 for ease of discussion) for guiding the rotation of the bearing portion 1026, as shown in FIG. 9B and FIG. 9C. In some embodiments, the switch drive plate 1024 further includes a guide block 1021 protruding toward the cover 107, and at a corresponding position on the cover 107 is provided a straight guide groove 1075 extending in the first direction H, as shown in FIG. 9B and FIG. 9C. The guide block 1021 is slidable within the straight guide groove 1075 to provide guidance for movement of the switch drive plate 1024 in the first direction H to make the sliding of the switch drive plate 1024 smoother.

In some embodiments, the guide block 1021 may be formed toward the cover 107 by stamping the switch drive plate 1024. It should be appreciated that the embodiment in which the guide block 1021 is formed by stamping is merely illustrative and is not intended to limit the scope of the disclosure. Any other suitable structures or arrangements are also possible. For example, in some embodiments, the guide block 1021 may also be mounted on the switch drive plate 1024 by plugging, welding, or riveting.

Referring back to FIG. 2 and FIG. 7, in order to achieve an accurate indication of the state of the switch 200 in the above process, in some embodiments, the conversion assembly 102 further includes a cam 1027, an indicating wheel 1028 and a push rod 1029. The cam 1027, indicating wheel 1028 and push rod 1029 may be located within housing 106. The cam 1027 is coaxial with worm gear 1042 and is rotatable along with worm gear 1042. The indicating wheel 1028 is provided on its outer circumference with an indicator 150 capable of displaying the state of the switch 200, as shown in FIG. 7. The indicator 150 may have an indication of a plurality of states including, for example, but not limited to a test state, a connected state, and so on.

Figure 12:
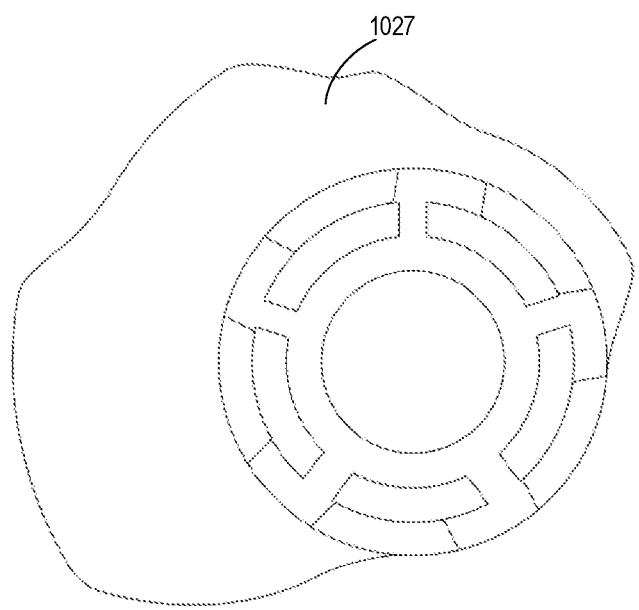
FIG. 12 illustrates a side view of a cam according to example embodiments of the present disclosure.

The push rod 1029 is disposed between the cam 1027 and the indicating wheel 1028. One end of the push rod 1029 abuts against a circumferential profile of the cam 1027 and the other end is pivotally coupled to the indicating wheel 1028. The circumferential profile of the cam 1027 includes a plurality of diameter-enlarged segments of and circular arc segments that are connected to one another, as shown in FIG. 12. As the cam 1027 rotates along with the worm gear 1042, the different circular arc segments and the diameter-enlarged segments will contact the push rod 1029. During the contacting of the diameter-enlarged segment with the push rod 1029, the push rod 1029 will move toward the indicating wheel 1028 due to the change in the diameter of the diameter-enlarged segment. This movement of the push rod 1029 causes the indicating wheel 1028 to rotate, thereby effecting instant changes of information displayed by the indicator 150.

When the circular arc segment contacts the push rod 1029, the push rod 1029 does not move, and the indicating wheel 1028 therefore does not rotate, and the state information displayed by the indicator 150 does not change at this time. It can be seen that the angle of the diameter-enlarged segment and the circular arc segment may be adjusted according to the rotational position of the worm gear 1042 and the relationship between the switch drive plate 1024 and the auxiliary drive plate 1034 to realize the display of the desired information. For example, in the case that the drive pin 1043 drives the auxiliary drive plate 1034 and drives the first male contact 1031 to contact the first female contact 1022, the indicator 150 is enabled to indicate that the switch 200 is in a "test" state by adjusting the diameter-enlarged segment and the circular arc section of the cam 1027.

As may be seen from the above, the withdrawable base module 100 according to an embodiment of the present disclosure may realize the instant changes and accurate display of the states of the switch 200 by the simple structure of the cam 1027 and the push rod 1029. This simple construction also significantly reduces the manufacturing and assembling costs of the withdrawable base module 100.

In some embodiments, an elastic member 1020 may also be disposed between the push rod 1029 and the indicating wheel 1028, as shown in FIG. 7. The elastic member 1020 may be a compression spring. The elastic member 1020 may be disposed in a groove formed by the push rod 1029, and both ends thereof respectively abut against and push an outer wall of the indicating wheel 1028 and a bottom wall of the above-mentioned groove of the push rod 1029 to apply the cam 1027 a force toward the push rod 1029, such that the push rod 1029 is held in abutment against the axial contour of the cam 1027. In some embodiments, as shown in FIG. 6, an indication window 1061 may be provided at a location of the housing 106 of the conversion assembly 102 corresponding to the indicator 150 of the indicating wheel 1028, to help the user to observe the status displayed by the indicator 150.

It should be understood that the above embodiments of the cam 1027 and the indicating wheel 1028 that implement the precise display of the state of the switch 200 are merely exemplary and are not intended to limit the scope of the disclosure. Any other suitable arrangements or structures are also possible. For example, in some embodiments, the display of the state of the switch 200 may also be accomplished by a linkage.

Although some specific embodiments of the present disclosure have already been displayed in detail by way of examples, those skilled in the art should appreciate that the above examples are only intended to exemplarily but non-restrictively limit the scope of the present disclosure. Those skilled in the art appreciate that the above embodiments may be modified without departing from the scope and essence of the present disclosure. The scope of the present disclosure is limited by the appended claims.

In the description and claims hereunder, unless otherwise additionally needed in the context, the terms "comprise" and "include" are understood as including the illustrated components or component groups, without excluding any other components or component groups.

Citations of any prior art in the description are not, and should not be considered as admitting to imply that these prior art constitute the common knowledge.

It should be appreciated that the claims below are examples of possible claims, and are not intended to limit the scope of the claims to any future patent application based on the present application. It is possible to add components to or delete components from the exemplary claims in the future to further limit or re-limit the present disclosure.

We claim:

1. A withdrawable base module for a switch, comprising:
   a base coupled to a busbar electrically connected to the switch, the base comprising a second female contact arranged to be electrically connected to the busbar;
   a conversion assembly coupled to the base and comprising a drive mechanism, a first female contact and a carrying mechanism adapted to carry the switch;
   an auxiliary assembly being slidable relative to the conversion assembly and comprising a first male contact electrically connected to the switch;
   wherein the drive mechanism is operable to drive the auxiliary assembly to slide to cause the first male contact to move towards and contact the first female contact to only close a test circuit for the switch; and
   a mounting assembly, the auxiliary assembly being attached to the mounting assembly and moveable relative to the mounting assembly, the mounting assembly comprising:
      a receiving portion adapted to receive the switch,
      an engagement portion coupled to the carrying mechanism, and
      a second male contact via which the switch contacts the second female contact to close the main circuit.

2. The withdrawable base module of claim 1, wherein the carrying mechanism comprises:
   a rotating shaft protruding towards the switch, and
   a bearing portion being rotatable about the rotating shaft and adapted to carry the switch.

3. The withdrawable base module of claim 2, wherein the conversion assembly further comprises:
   a switch drive plate coupled to an end of the bearing portion, and operable to move in response to a further operation of the drive mechanism after the test circuit is closed, to cause the bearing portion to rotate about the rotating shaft to drive the switch to move towards the base, such that the switch contacts the base to electrically connect the switch to the busbar to close a main circuit of the switch.

4. The withdrawable base module of claim 3, wherein the drive mechanism comprises:
   a worm operable to rotate about its own axis;
   a worm gear coupled to the worm and operable to rotate about an axis perpendicular to the worm in response to a rotation of the worm; and
   a drive pin arranged on the worm gear and being parallel to the axis, the drive pin being adapted to rotate about the axis with a rotation of the worm gear.

5. The withdrawable base module of claim 4, wherein the auxiliary assembly comprises an auxiliary drive plate on which the first male contact is mounted, the auxiliary drive plate and the switch drive plate being parallel to each other.

6. The withdrawable base module of claim 5, wherein the auxiliary drive plate comprises an auxiliary drive straight groove extending in a second direction perpendicular to a first direction of movement of the auxiliary drive plate, and the switch drive plate comprises a main arcuate groove with a center being located on the axis,
   wherein the drive pin is arranged to slide within the auxiliary drive straight groove through the main arcuate groove to drive the auxiliary drive plate to move.

7. The withdrawable base module of claim 6, wherein the auxiliary drive plate further comprises an auxiliary arcuate groove in communication with the auxiliary drive straight groove, a center of the auxiliary arcuate groove is located on the axis, and the switch drive plate comprises a main drive straight groove in communication with the main arcuate groove and extending in the second direction;

wherein the drive pin is arranged to slide within the auxiliary arcuate groove through the main drive straight groove to drive the switch drive plate to move.

8. The withdrawable base module of claim 4, wherein the conversion assembly further comprises:

a cam being coaxial with the worm gear and adapted to rotate with the worm gear;

an indicating wheel comprising an indicator for indicating a state of the switch arranged on an outer circumference of the indicating wheel; and a push rod with one end abutting against a circumferential profile of the cam and the other end being coupled to the indicating wheel, to drive the indicating wheel to rotate in response to a rotation of the cam to indicate a current state of the switch.

9. The withdrawable base module of claim 8, wherein the circumferential profile of the cam comprises a plurality of diameter-enlarged segments and circular arc segments connected to one another.

10. The withdrawable base module of claim 8, wherein the conversion assembly further comprises an elastic member arranged between the push rod and the indicating wheel and configured to cause the push rod to abut against the circumferential profile of the cam.

11. The withdrawable base module of claim 8, wherein the conversion assembly further comprises a housing to at least partially receive the switch drive plate, the drive mechanism and the indicating wheel, the housing comprising an indication window for indicating the current state of the switch.

12. The withdrawable base module of claim 7, wherein the conversion assembly further comprises a cover being parallel to the switch drive plate and comprising a stopping portion towards the switch drive plate; and the drive mechanism further comprises a self-locking mechanism pivotally arranged on the drive pin and comprising a self-locking pin and a protrusion protruding towards the axis;

wherein in a case where the drive pin has slid to an end of the main arcuate groove adjacent to the main drive straight groove, the self-locking pin abuts against a side wall of the main arcuate groove and the protrusion is blocked by the stopping portion.

13. The withdrawable base module of claim 12, wherein the cover comprises a first arcuate guide groove arranged to overlap the main arcuate groove and the auxiliary arcuate groove to provide guidance for the drive pin when the drive pin slides along the main arcuate groove and the auxiliary arcuate groove.

14. The withdrawable base module of claim 12, wherein the cover comprises a second arcuate guide groove for the bearing portion to pass through and adapted to provide guidance for the bearing portion when the bearing portion rotates about the rotating shaft.

15. The withdrawable base module of claim 13, wherein the first arcuate guide groove comprises an inner chute formed on an inner side wall of the first arcuate guide groove adjacent to the axis, and the inner chute protruding substantially in the first direction such that in a case where the drive pin slides within the main drive straight groove to drive the switch drive plate to move, the self-locking pin slides along the inner chute.

16. The withdrawable base module of claim 13, wherein the main arcuate groove comprises a main chute formed on an outer side wall of the main arcuate groove away from the axis, the main chute extending away from the axis to make the self-locking pin to slide within the main chute and slide into the main arcuate groove when the drive pin slides within the main arcuate groove; and the first arcuate guide groove comprises an outer chute formed on an outer side wall of the first arcuate guide groove away from the axis, the outer chute overlapping the main chute.

17. The withdrawable base module of claim 14, wherein the cover further comprises a straight guide groove extending in the first direction, and the switch drive plate further comprises a guide block protruding towards the cover, the guide block adapted to slide within the straight guide groove to provide guidance for a movement of the switch drive plate.

18. A withdrawable base module for a switch, comprising:
a base coupled to a busbar electrically connected to the switch;
a conversion assembly coupled to the base and comprising a drive mechanism, a first female contact and a carrying mechanism adapted to carry the switch;
an auxiliary assembly being slidable relative to the conversion assembly and comprising a first male contact electrically connected to the switch;
wherein the drive mechanism is operable to drive the auxiliary assembly to slide to cause the first male contact to move towards and contact the first female contact to only close a test circuit for the switch;
the carrying mechanism comprising a rotating shaft protruding towards the switch and a bearing portion being rotatable about the rotating shaft and adapted to carry the switch; and
the conversion assembly comprising a switch drive plate coupled to an end of the bearing portion, and operable to move in response to a further operation of the drive mechanism after the test circuit is closed, to cause the bearing portion to rotate about the rotating shaft to drive the switch to move towards the base, such that the switch contacts the base to electrically connect the switch to the busbar to close a main circuit of the switch.

19. The withdrawable base module of claim 18, wherein the drive mechanism comprises:
a worm operable to rotate about its own axis;
a worm gear coupled to the worm and operable to rotate about an axis perpendicular to the worm in response to a rotation of the worm; and
a drive pin arranged on the worm gear and being parallel to the axis, the drive pin being adapted to rotate about the axis with a rotation of the worm gear.

20. The withdrawable base module of claim 19, wherein the conversion assembly further comprises:
a cam being coaxial with the worm gear and adapted to rotate with the worm gear;
an indicating wheel comprising an indicator for indicating a state of the switch arranged on an outer circumference of the indicating wheel; and
a push rod with one end abutting against a circumferential profile of the cam and the other end being coupled to the indicating wheel, to drive the indicating wheel to rotate in response to a rotation of the cam to indicate a current state of the switch.

* * * * *